(12) United States Patent
Watts et al.

(10) Patent No.: US 11,061,942 B2
(45) Date of Patent: Jul. 13, 2021

(54) UNSTRUCTURED DATA FUSION BY CONTENT-AWARE CONCURRENT DATA PROCESSING PIPELINE

(71) Applicant: Gravwell, Inc., Coeur d'Alene, ID (US)

(72) Inventors: Kristopher Watts, Idaho Falls, ID (US); Corey Thuen, Spirit Lake, ID (US)

(73) Assignee: Graywell, Inc., Coeur d'Alene, ID (US)

( * ) Notice: Subject to any disclaimer, the term of this patent is extended or adjusted under 35 U.S.C. 154(b) by 445 days.

(21) Appl. No.: 16/124,405

(22) Filed: Sep. 7, 2018

(65) Prior Publication Data

US 2020/0082015 A1   Mar. 12, 2020

(51) Int. Cl.
*G06F 17/00* (2019.01)
*G06F 16/31* (2019.01)
*G06F 9/52* (2006.01)

(52) U.S. Cl.
CPC .............. *G06F 16/316* (2019.01); *G06F 9/52* (2013.01)

(58) Field of Classification Search
None
See application file for complete search history.

(56) References Cited

U.S. PATENT DOCUMENTS

| | | | |
|---|---|---|---|
| 7,203,635 B2 | 4/2007 | Oliver et al. | |
| 7,362,701 B2 | 4/2008 | Marejka et al. | |
| 7,650,331 B1 | 1/2010 | Dean et al. | |
| 7,779,017 B2 | 8/2010 | Haselden et al. | |
| 8,949,175 B2 | 2/2015 | Wu et al. | |
| 9,323,767 B2 | 4/2016 | Blanchflower et al. | |
| 9,665,088 B2 | 5/2017 | Nixon et al. | |
| 9,684,513 B2 | 6/2017 | Bai et al. | |
| 9,886,486 B2 | 2/2018 | De Castro Alves et al. | |
| 9,996,597 B2 | 6/2018 | Anderson et al. | |
| 2006/0215588 A1 | 9/2006 | Yoon | |
| 2008/0288889 A1* | 11/2008 | Hunt | G06Q 30/02 715/810 |
| 2010/0306208 A1 | 12/2010 | Haselden | |
| 2011/0161333 A1 | 6/2011 | Langseth | |

(Continued)

FOREIGN PATENT DOCUMENTS

CN    103838847 A    6/2014

OTHER PUBLICATIONS

Surender Reddy Yerva et al., "Cloud based Social and Sensor Data Fusion", pp. 1-8.

(Continued)

*Primary Examiner* — Tuankhanh D Phan
(74) *Attorney, Agent, or Firm* — Muncy, Geissler, Olds & Lowe, P.C.; Aaron J. Sanders

(57) ABSTRACT

The disclosure relates to a data analytics platform in which a linear pipeline processing framework may use an abstracted query language to define a data fusion pipeline assembly mechanism. More particularly, the linear pipeline processing framework may include various operator groups that work in conjunction to organize data entries that can have substantially disparate data types (e.g., text, binary, video, audio, etc.) into a single normalized stream such that one or more processing modules may perform type-specific data processing and feature extraction, normalize an output into a single stream, and finally render the different data types as a fused output.

23 Claims, 14 Drawing Sheets

(56) References Cited

U.S. PATENT DOCUMENTS

| | | |
|---|---|---|
| 2011/0196880 A1 | 8/2011 | Soules et al. |
| 2014/0280361 A1 | 9/2014 | Aliferis et al. |
| 2015/0019530 A1 | 1/2015 | Felch |
| 2016/0179063 A1 | 6/2016 | De Baynast De Septfontaines et al. |
| 2016/0275123 A1 | 9/2016 | Lin et al. |
| 2017/0070554 A1* | 3/2017 | Mayrand ............. H04L 65/4069 |
| 2017/0220964 A1 | 8/2017 | Datta Ray |
| 2018/0314744 A1* | 11/2018 | Mathew ................... G06F 9/50 |

OTHER PUBLICATIONS

Yu Zheng, "Methodologies for Cross-Domain Data Fusion: An Overview", IEEE Transactions on Big Data, TBD-2015-05-0037, pp. 1-18.

* cited by examiner

UNSTRUCTURED DATA FUSION BY CONTENT-AWARE CONCURRENT DATA PROCESSING PIPELINE

TECHNICAL FIELD

The various aspects and embodiments described herein generally relate to a data analytics platform, and in particular, to a linear pipeline processing framework that uses an abstracted query language to define a data fusion pipeline assembly mechanism.

BACKGROUND

In common parlance, the term "big data" is generally understood to refer to voluminous and complex data sets that conventional data processing systems cannot adequately handle. In practice, however, the term implicates challenges in many facets and dimensions, which include but are not limited to data capture, storage, analysis, query, search, visualization, and so on. Not only have data sets grown more and more voluminous, data sets are now generated with more diversity, speed, and noise than ever before. For example, data is generated whenever a person engages in online activity, carries a location-enabled smartphone while going about their day, or does anything else that involves a digital action or otherwise leaves a digital footprint. Moreover, with the increasing prevalence of technologies such as the Internet of Things, data is generated whenever "smart" machines communicate with one another, whether in the home, at the workplace, in industrial settings, or otherwise. Accordingly, because data sets are no longer limited to information stored in databases and other conventional data sources, modern data analytics should have the ability to handle unstructured data streams that can include images, videos, sound, binaries, text, and/or other data modalities, which may differ with respect to representation, distribution, scale, density, etc. (e.g., whereas text is usually represented as discrete sparse word count vectors, images may be represented according to pixel intensities, points of interest may be represented as spatial points associated with a given category, and so on). As such, data analytics tools should not treat disparate data sets equivalently, and normalization (e.g., converting all data to text data, which existing unstructured data platforms tend to require) can quickly become the dominating factor limiting a data ingest rate. There is therefore a need for mechanisms that have the ability to fuse and extract value from unstructured data.

Another important factor in data analytics systems is that the volume, variety, and velocity (as well as questionable veracity) of incoming data can quickly become overwhelming, which increases the difficulty to extract actionable intelligence or other value from the incoming data. What users need is a data analytics platform that can get up and running as fast as possible, does not require users to know what they do not know (or may want to know at some point in the future), and perform analytics on the data in a manner that enables users to rapidly explore data and build useful dashboards (or views) into the data in order to gain new insights, make predictions, make smarter decisions, and/or otherwise extract actionable intelligence from the data. Furthermore, although security is certainly one area in which data analytics has substantial value, the need for better data analytics extends into many other areas. As such, a data analytics platform should turn data into actual, usable, information and actionable intelligence and thereby enable organizations, individual users, and other entities to accomplish their mission, whatever that mission happens to be. Nonetheless, existing data analytics tools tend to fall short at least in areas that relate to speed, cost, flexibility, and complexity that increases the cognitive overhead on human operators. There is therefore a further need for a data analytics platform that enables high speed ingest and search, flexible data handling, and reduced cognitive overhead when users wish to engage the platform in order to extract meaning from large data sets.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a data analytics platform as described herein may enable a linear pipeline processing framework that substantially reduces the cognitive overhead on a human operator in crafting a data fusion pipeline compared to conventional architectures such as MapReduce. The linear pipeline processing framework allows an abstracted query language to define a data fusion pipeline assembly mechanism without explicit definition of data location, context, extraction, or normalization such that a human may think in terms of an assembly line, defining discrete operations without the need to perform a join on fully normalized data. The data analytics platform may remove the need for a user to be aware of data location or full normalization, while transparently leveraging concurrency to achieve high throughput.

According to various aspects, the data analytics platform described herein may comprise a single concurrent pipeline that contains four operator groups: storage, locality, selection, and renderer. The first operator group named "storage" is a storage subsystem that allows a data subset to be described via one or more identifiers that are expressed in a human-friendly (or human-readable) form. Each data entry in the data subset may include at least a byte array and a timestamp, wherein the timestamp may provide a temporal anchor to the data entry. In various embodiments, this temporal anchor may be derived from the data entry byte array and/or generated upon storage of the data entry. For example, the data entry may be given a timestamp at the time that the data entry is ingested and/or based on a time contained in the data entry itself, when available. The storage system may use the one or more identifiers to select relevant storage locations across N machines, each containing up to M storage arrays, and the storage system may extract data entries from the storage systems based on the temporal anchor such that the extracted data entries can be streams into a unified pipeline in a temporally ordered manner. The second operator group named "locality" may examine the totality of the abstracted query language and dynamically determine the optimal locality of execution for each component of the pipeline. As a result, the human need not think about where data is being processed as the locality operator group may distribute and execute the appropriate processing modules co-resident with the stored data and dynamically combine the data into a single processing stream. The third operator group named "selection" may enable the pipeline to establish linkages from data groupings to processing modules. In general, the pipeline may operate in a linear and concurrent manner, with each module operating only on the data groupings that the module is capable of operating on, passing on all other data down the pipeline. The final operator group named "renderer" may then receive the processed output and down select the data to only that which is needed in order to visualize or otherwise convey a fused and final output to the user. Accordingly, the unified, linear, and concurrent processing methodology set forth herein may allow for simplified abstraction of data processing while increasing the capability of a processing pipeline without dramatically increasing the complexity as presented to the user. The resulting methodology allows fusion of highly disparate data types such as text, sound, video, and others while allowing a human to think and operate in small discrete units.

According to various aspects, a method for unstructured data fusion may comprise receiving a plurality of data entries at an indexer cluster comprising one or more indexer machines, wherein the plurality of data entries may each comprise at least a timestamp, a tag, and a byte array, selecting, at the one or more indexer machines, a location within a storage system for storing each of the plurality of data entries in a raw form based at least in part on the tag associated with each data entry, assembling a data fusion pipeline configured to operate on multiple subsets of the plurality of data entries that have different data types and are associated with at least one tag, wherein the data fusion pipeline may comprise one or more processing modules configured to process the different data types in the raw form, distributing the one or more processing modules for execution on one or more of the indexer machines that are co-resident with the location where the multiple subsets of the plurality of data entries are stored, wherein the one or more distributed processing modules may collectively fuse the multiple subsets of the plurality of data entries that have the different data types into a single data stream, and rendering, at a webserver, an output to visualize results produced by the one or more processing modules, wherein the rendered output fuses information extracted from the multiple subsets of the plurality of data entries that have the different data types.

According to various aspects, a data analytics system may comprise an indexer cluster having one or more indexer machines configured to receive a plurality of data entries that each comprise at least a timestamp, a tag, and a byte array and to select a location within a storage system for storing each of the plurality of data entries in a raw form based at least in part on the tag associated with each data entry, a search orchestrator configured to assemble a data fusion pipeline configured to operate on multiple subsets of the plurality of data entries that have different data types and are associated with at least one tag, wherein the data fusion pipeline may comprise one or more processing modules configured to process the different data types in the raw form, and wherein the search orchestrator may be further configured to distribute the one or more processing modules for execution on one or more of the indexer machines that are co-resident with the location where the multiple subsets of the plurality of data entries are stored, wherein the one or more distributed processing modules are collectively configured to fuse the multiple subsets of the plurality of data entries that have the different data types into a single data stream, and a webserver configured to render an output to visualize results produced by the one or more processing modules, wherein the rendered output fuses information extracted from the multiple subsets of the plurality of data entries that have the different data types.

According to various aspects, a non-transitory computer-readable storage medium may have computer-executable instructions recorded thereon, wherein the computer-executable instructions may be configured to cause one or more processors to receive, at an indexer cluster comprising one or more indexer machines, a plurality of data entries that each comprise at least a timestamp, a tag, and a byte array, select, at the one or more indexer machines, a location within a storage system for storing each of the plurality of data entries in a raw form based at least in part on the tag associated with each data entry, assemble a data fusion pipeline configured to operate on multiple subsets of the plurality of data entries that have different data types and are associated with at least one tag, wherein the data fusion pipeline comprises one or more processing modules configured to process the different data types in the raw form, distribute the one or more processing modules for execution on one or more of the indexer machines that are co-resident with the location where the multiple subsets of the plurality of data entries are stored, wherein the one or more distributed processing modules may collectively fuse the multiple subsets of the plurality of data entries that have the different data types into a single data stream, and render, at a webserver, an output to visualize results produced by the one or more processing modules, wherein the rendered output fuses information extracted from the multiple subsets of the plurality of data entries that have the different data types.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
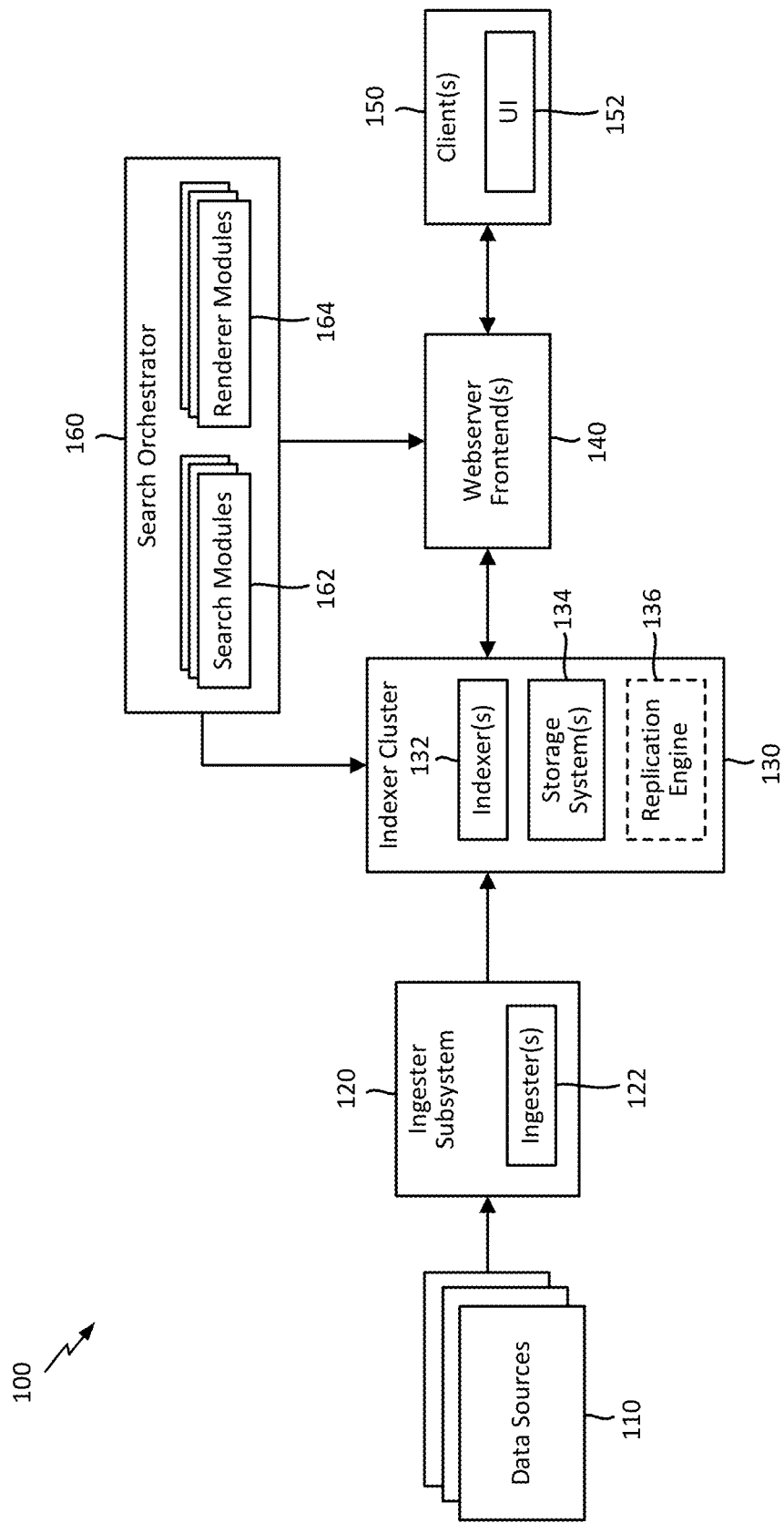
FIG. 1 illustrates an exemplary data analytics platform in which a linear pipeline processing framework may use an abstracted query language to define a data fusion pipeline assembly mechanism, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

According to various aspects, a data analytics platform as described herein may enable a linear pipeline processing framework that substantially reduces the cognitive overhead on a human operator in crafting a data fusion pipeline compared to conventional architectures such as MapReduce. The linear pipeline processing framework may define a data fusion pipeline assembly mechanism according to an abstracted query language without requiring data location, context, extraction, and/or normalization to be explicitly defined. As such, a human user operating or otherwise interacting with the data analytics platform may think in assembly line terms, defining discrete operations without the need to perform a join on fully normalized data. The data analytics platform may remove the need for the user to be aware of data location or full normalization, while transparently leveraging concurrency to achieve high throughput.

According to various aspects, the data analytics platform described herein may comprise a single concurrent pipeline that contains four operator groups: storage, locality, selection, and renderer. The first operator group named "storage" is a storage subsystem that allows a data subset to be described via one or more identifiers that are expressed in a human-friendly (or human-readable) form. Each data entry in the data subset may include at least a byte array and a timestamp, wherein the timestamp may provide a temporal anchor to the data entry. In various embodiments, this temporal anchor may be derived from the data entry byte array and/or generated upon storage of the data entry. For example, the data entry may be given a timestamp at the time that the data entry is ingested and/or based on a time contained in the data entry itself, when available. The storage system may use the one or more identifiers to select relevant storage locations across N machines, each containing up to M storage arrays, and the storage system may extract data entries from the storage systems based on the temporal anchor such that the extracted data entries can be streams into a unified pipeline in a temporally ordered manner. The second operator group named "locality" may examine the totality of the abstracted query language and dynamically determine the optimal locality of execution for each component of the pipeline. As a result, the human need not think about where data is being processed as the locality operator group may distribute and execute the appropriate processing modules co-resident with the stored data and dynamically combine the data into a single processing stream. The third operator group named "selection" may enable the pipeline to establish linkages from data groupings to processing modules. In general, the pipeline may operate in a linear and concurrent manner, with each module operating only on the data groupings that the module is capable of operating on, passing on all other data down the pipeline. The final operator group named "renderer" may then receive the processed output and down select the data to only that which is needed in order to visualize or otherwise convey a fused and final output to the user. Accordingly, the unified, linear, and concurrent processing methodology set forth herein may allow for simplified abstraction of data processing while increasing the capability of a processing pipeline without dramatically increasing the complexity as presented to the user.

Furthermore, as will be described in further detail herein, the storage, locality, selection, and renderer operator groups may work in conjunction to implement a methodology in which highly disparate data types such as text, sound, video, and others can be fused into a single normalized stream while allowing a human to think and operate in small discrete units. For example, the various operator groups may provide the ability to organize data entries having highly disparate data types that may otherwise be entirely incompatible (e.g., text logs, network data, voice, video, etc.) into a single normalized stream. As such, processing and feature extraction may be performed on the organized data entries and the output may be normalized into a single stream where the data entries having the different data types can eventually be rendered using a single renderer. For instance, one concrete example of the unstructured data fusion methodology may be where video from a secure door entry system is streamed along with data from proximity sensors and/or keycard access logs. The unstructured data fusion methodology may provide the ability to operate on all three data streams to provide a single view into building access, which may be used to detect tailgating or people without valid keycards loitering around a secure door, among other things. Accordingly, in the following description, the storage, locality, selection, and renderer operator groups may collectively provide the ability to fuse unstructured data through joining entirely incompatible data types within a single normalized stream.

According to various aspects, FIG. 1 illustrates an exemplary data analytics platform 100 that may implement a linear pipeline processing framework having the above-mentioned characteristics, whereby the linear pipeline processing framework (and thus the data analytics platform 100) may be configured to use an abstracted query language to define a data fusion pipeline assembly mechanism.

More particularly, referring to FIG. 1, the data analytics platform may include, among other things, an ingester subsystem 120 comprising one or more ingesters 122 that are configured to receive, collect, or otherwise obtain raw data from one or more data sources 110. For example, in various embodiments, the one or more data sources 110 may be configured to generate the raw data in the form of packet capture (pcap) or other suitable binary data, log files, images, audio, video, text, and so on. In general, the raw data taken from the data sources 110 may be substantially or entirely unstructured, meaning that the raw data is not required to have to a predefined data model, not required to be normalized or otherwise organized at the time of ingest, not required to have any particular format, etc. In other words, the ingester subsystem 120 may take an "ingest first, ask questions later" approach, in that the ingester(s) 122 may bundle the raw data obtained from the data sources 110 into data entries that are then provided to an indexer cluster 130 comprising one or more indexers 132 that are configured to store, retrieve, and process the data entries, as will be described in further detail below.

According to various aspects, each data entry created at the ingester subsystem 120 based on the incoming raw data may comprise at least a byte array and a timestamp, wherein the timestamp may provide a temporal anchor used by the storage, locality, selection, and renderer operator groups mentioned above. Furthermore, in various embodiments, one or more data entries may optionally include one or more additional fields that can be used to provide more information about the data entry. For example, in various embodiments, the additional fields may include a tag field that associates a specific data entry with a specific tag in the indexer cluster 130, which may make the data entry easier to search at a later time. In another example, the additional fields may include a source address (e.g., a source IP address). In general, however, those skilled in the art will appreciate that any suitable fields may be defined to provide more detail about the data entry and thereby enable more robust data analytics. For example, in various embodiments, a given data entry may be structured as follows:

TABLE 1

Example Data Entry type Entry struct {
    TS    Timestamp    // temporal anchor
    SRC  net.IP       // data source address
    Tag   EntryTag     // human-friendly identifier
    ...                             // additional optional fields
    Data  [ ]byte      // byte array
}

According to various aspects, referring still to FIG. 1, the data analytics platform 100 may further include the indexer cluster 130 arranged to receive the data entries created at the ingester subsystem 120 and a webserver frontend 140 arranged to provide a focusing point for all searches and to provide an interactive interface into the data analytics platform 100 (e.g., via the user interface 152 on the client node(s) 150). In general, the data analytics platform 100 may be designed for scalable deployment to virtually any infrastructure such that the indexer cluster 130 and/or the webserver frontends 140 may be deployed on a single machine, in the cloud, in a private compute infrastructure, in isolated environments such as an Industrial Control Systems (ICS) environment or a secure facility, on an embedded device, and/or another suitable environment. As such, in various implementations, the indexer cluster 130 and the webserver frontend 140 may be installed on a single machine. However, the various aspects described herein contemplate that the data analytics platform 100 may be implemented as a distributed system, allowing for multiple indexers 132 and/or multiple webserver frontends 140 to be deployed or otherwise distributed in a cluster across multiple machines, as will be described in further detail below.

According to various aspects, as noted above, the indexer cluster 132 may generally comprise one or more indexers 132 that are configured to receive data entries from the ingesters 122 and to select appropriate locations to store the data entries within one or more storage systems 134. In particular, as will be described in further detail below in relation to at least FIG. 6, the one or more storage systems 134 may include appropriate storage resources distributed across N machines, each containing up to M storage arrays that are configured as data wells to logically and physically separate data entries that may have different types. For example, if present, the indexers 132 may use the human-friendly tags associated with the incoming data entries to select the relevant storage locations within the one or more storage systems 134. Accordingly, the tags that the ingesters 122 apply to the data entries may be used to logically and physically separate data entries so that the data entries can be routed to the appropriate location for storage and for subsequent retrieval and processing. For example, in various embodiments, unique tags may be applied to syslog logs, Apache logs, network packets, video streams, audio streams, etc. in order to distinguish different data entries, while the data wells may correspond to the storage grouping(s) that actually organize and store the ingested data entries. Accordingly, the indexer(s) 132 may assign certain tags to certain wells so that data streams can be routed to the optimal storage pools. For example, a raw pcap stream from a high bandwidth link may need to be assigned to a faster storage pool, whereas log entries from syslog or a webserver may not require fast storage. In general, a given tag-to-well mapping is a one-to-one mapping, meaning that a single tag cannot be assigned to multiple wells. Furthermore, logically and physically separating data streams allows for setting different rules for the ingested data entries. For example, high bandwidth streams such as network traffic may be expired or compressed at periodic intervals (e.g., every fifteen days) while low bandwidth streams may be retained for much longer. The logical separation may also increase search performance as a search orchestrator 160 intelligently queries the appropriate well based on tag.

Accordingly, the indexer cluster 130 may generally be configured to act as a storage center in the data analytics platform 100, wherein the indexers 132 associated therewith may be responsible for storing, retrieving, and processing ingested data entries. Furthermore, in various embodiments, the indexers 132 may be configured to perform substantial initial processing when executing a query, first finding the appropriate data entries then pushing the data entries into a search pipeline in a temporally ordered manner. As noted above, the search pipeline (e.g., the locality operator group) may distribute as much of a query as possible to ensure that the indexers 132 can do as much initial processing in parallel as possible. As such, the storage system 134 may preferably include substantial high-speed low-latency storage resources and random access memory (RAM). For example, the indexers 132 may have the ability to utilize file system caches, meaning that the indexers 132 may have the ability to run multiple search queries over the same data from the file system caches without having to retrieve any data entries from disks associated with the storage systems 134, which may substantially improve search performance.

According to various aspects, as shown in FIG. 1, the indexer cluster 130 may further include a replication engine 136 that may allow for fault-tolerant high availability deployments. The replication engine 136 may be configured to transparently manage data replication across distributed indexers 132 with automatic failover, load balanced data distribution, and compression. Furthermore, in various embodiments, the replication engine 136 may provide fine-tuned control over exactly which wells are included in replication and how the data is distributed across peers. For example, the indexer cluster 130 may be deployed with uniform data distribution or implement a replication scheme in which entire data center failures can be tolerated using region-aware peer selection. The online failover system may also allow continued access to data even when some indexers 132 are offline. Exemplary functionality associated with the replication engine 136 will be described in further detail below.

According to various aspects, as mentioned above, the webserver frontend 140 shown in FIG. 1 may provide a focusing point for all searches and further provide an interactive interface into the data analytics platform 100 (e.g., via the user interface 152 on the client node(s) 150). As such, when an appropriate search query is received or otherwise invoked (e.g., via a command line interface, a scripting engine, etc.), the search orchestrator 160 may generally assemble an unstructured data fusion pipeline (or simply "search pipeline") according to an abstracted query language used to express the search query without requiring that data location, context, extraction, and/or normalization be explicitly defined. In particular, the search orchestrator 160 may assemble the unstructured data fusion pipeline using one or more search modules 162 that are distributed and executed co-resident with the data on which the search module(s) 162 are configured to operate such that disparate and potentially incompatible data types may be joined or otherwise fused into a single normalized stream.

For example, in various embodiments, a particular search query may use the abstracted query language to specify a "upstream" data source (e.g., data entries associated with a particular tag), then specify one or more search modules 162 to analyze the data entries and filter out undesired data and/or extract interesting portions of the data, and finally specify a "downstream" renderer module 164 configured to down select the data output from the search modules 162 to only that which is needed in order to visualize or otherwise convey a fused and final output. For example, the following search query fetches data entries tagged "reddit" and then uses a json search module 162 to extract a field called "Body" before using an eval search module 162 to filter out any data entries with a Body field longer than twenty (20) characters, finally using a table renderer module 164 to display the contents of the Body fields in a table:

TABLE 2

Example Search Pipeline tag=reddit json Body | eval len(Body) < 20 | table Body

According to various aspects, a given search pipeline in the data analytics platform 100 may therefore include one or multiple search modules 162 that are arranged one after another in a substantially linear and concurrent manner, distributed and executed co-resident with the data on which the search module(s) 162 are configured to operate. Each search module 162 may operate on the results of the previous search module 162 in the search pipeline (e.g., the above example includes two search modules 162, json and eval, wherein the eval search module 162 operates on the results of the json search module 162). Furthermore, the renderer modules 164 take the results generated by the search modules 162 and produce a fused and final output suitable to convey to the user via the user interface 152 (e.g., in the above example, the table renderer module 164 is used to create a table suitable for displaying the contents of the enumerated Body fields). In general, a given search pipeline may include one renderer module 164, at the very end of the search pipeline. Accordingly, while the indexer cluster 130 in conjunction with the ingester subsystem 120 may generally implement the storage operator group mentioned above, the search pipeline may be dynamically assembled to at least partially implement the above-mentioned locality, selection, and renderer operator groups. For example, assuming that ingested data entries tagged "reddit" are stored in a particular data well, the json search module 162 configured to extract the Body field from such entries may be distributed and executed co-resident with such data entries by the locality operator group before the processed data entries are dynamically combined into a single processing stream for the eval search module 162. The selection operator group may then process the data in the pipeline in a manner that applies structures and adds intelligence to the unstructured data at runtime. For example, the selection operator group may be implemented via one or more tag descriptors that are handed to appropriate search modules 162, each of which may perform different actions on different data entries depending on the provided tag descriptor(s). Accordingly, the selection operator group may allow for feature extraction (e.g., extracting the Body element from raw JSON data), filtering (e.g., removing any data entries where the Body element does not contain specific data items), and/or alteration (e.g., processing the Body element to perform language translation). Furthermore, as noted above, the table renderer module 164 takes the results generated via the json and eval search modules 162 and down selects to contents of the Body fields in order to produce a fused and final output, thus implementing the renderer operator group mentioned above.

According to various aspects, the abstracted query language may include various enumerated values that are used by the search module(s) 162 and the renderer module(s) 164 forming the search pipeline. For example, in various embodiments, the enumerated values may include a source (SRC) enumerated value corresponding to the source of a given data entry, a tag (TAG) enumerated value representing the tag attached to the data entry at the ingester subsystem 120, and a timestamp (TIMESTAMP) enumerated value corresponding to the timestamp of the data entry. Furthermore, in various embodiments, the abstracted query language may allow user-defined enumerated values to be created and used in a search pipeline associated with a given search query. For example, in the search pipeline below, several enumerated values are created:

TABLE 3

Example Search Pipeline tag=reddit json Body | langfind -e Body | count by lang | sort by count desc | table lang count In the above example, the json search module 162 first parses JavaScript Object Notation (JSON) in raw data entries and pulls out a "Body" element, which is stored in a user-defined enumerated value named Body. The langfind search module 162 then accesses the Body enumerated values and attempts to analyze the language used, with the result put in a new enumerated value called lang. Next, the count search module 162 reads the lang enumerated values and counts how many times each value appears, storing the results in enumerated values named count. The rest of the search pipeline sorts the results in descending order based on the count enumerated values and creates a table from the lang and count enumerated values.

According to various aspects, the search modules 162 available in the data analytics platform 100 may each be configured to operate on data in a passthrough mode, meaning that the search modules 162 are configured to perform some action (e.g., filter, modify, sort, etc.) on the data entries and then pass the entries down the search pipeline. Furthermore, as noted above, each search module 162 may only operate on the data entries that the respective search module 162 is capable of or configured to operate on, passing on all other data down the search pipeline. In general, there can be many search modules 162 in a given search pipeline and each search module 162 may operate in a separate lightweight thread. As such, if there are N search modules 162 in a search pipeline, the search pipeline will spread out and use N threads. Furthermore, certain search modules 162 may cause distributed searches to collapse and/or sort. For example, a search module 162 that collapses may force the distributed search pipeline to collapse, meaning that the search module 162 as well as all downstream search modules 162 execute on the frontend 140. Accordingly, optimal performance may be achieved in use cases that put as many parallel search modules 162 as possible upstream of the first collapsing search module 162, as this approach may decrease pressure on the communication pipe and allow for greater parallelism in the data analytics platform 100.

According to various aspects, as mentioned above, the renderer modules 164 that are available in the data analytics platform 100 may be configured to receive data from the search module(s) 162 in the search pipeline and organize the received data in a manner suitable for display to the user via a user interface 152. In various embodiments, one or more of the renderer modules 164 may provide for a second order temporal index, which may allow a user to move around and zero in on time spans within the original search. Renderer modules 164 can optionally save search results in an appropriate storage location (not explicitly shown in FIG. 1) such that the search results can be reopened and viewed, exported, or even passed to another instance of the data analytics platform 100. Furthermore, saving search results may be useful to archive a particular data view or preserve results even after stored data has been expired or deleted.

According to various aspects, as mentioned above, the search orchestrator 160 may assemble an unstructured data fusion pipeline (or "search pipeline") when an appropriate search query is received or otherwise invoked at the webserver frontend 140, wherein the search query may be expressed according to an abstracted query language that does not require an explicit definition of data location, context, extraction, and/or normalization. Rather, the search orchestrator 160 may evaluate the totality of the abstracted query language and dynamically determine the optimal locality of execution for each component of the search pipeline, which may typically include one or more search modules 162 and a single renderer module 164. As a result, the human operator need not think about where data is being processed as the appropriate search module(s) 162 and renderer modules 164 may instead be distributed and executed co-resident with the stored data for dynamic combination into a single processing stream. For example, in various embodiments, the search orchestrator 160 may identify one or more search modules 162 specified in the search query and distribute at least a subset of the search modules 162 for execution on a machine in the indexer cluster 130 that is co-resident with the stored data. As such, the search module(s) 162 distributed for execution in the indexer cluster 130 may query one or more appropriate wells in the storage system(s) 134 based on the tag(s) further specified in the search query.

In this manner, the indexers 132 may perform the initial heavy lifting when executing the search query, first finding the appropriate data entries (e.g., data entries matching the tag(s) specified in the search query) and then pushing the data entries into the search pipeline. The search pipeline may distribute various search module(s) 162 to operate on the data entries retrieved from the storage system(s) 134 in parallel to the extent possible. Furthermore, the webserver frontend 140 may also participate in the search pipeline in that the webserver frontend 140 may perform some of the filtering, metadata extraction, and rendering of data. As such, when the search orchestrator 160 distributes the components of the search pipeline, at least the renderer module 164 at the end of the pipeline may be distributed for execution at the webserver frontend 140.

The search orchestrator 160 may further enable the search pipeline to establish linkages from data groupings to the search and renderer modules 162, 164, wherein the search pipeline may generally operate in a linear and concurrent manner, with each search module 162 only operating on the data groupings that the search module 162 is capable of operating on, passing on all other data down the search pipeline before the renderer module 164 receives the processed output and down selects the data to only that which is needed in order to visualize or otherwise convey a fused and final output to the user via the user interface(s) 152 at the client device(s) 150. Accordingly, the unified, linear, and concurrent processing methodology set forth herein may allow for simplified abstraction of data processing while increasing the capability of a processing pipeline without dramatically increasing the complexity as presented to the user. The resulting methodology allows fusion of highly disparate data types such as text, sound, video, and others while allowing a human to think and operate in small discrete units.

According to various aspects, as mentioned above, the data analytics platform 100 shown in FIG. 1 may be designed for scalable deployment to virtually any infrastructure, which may include but is not limited to a single machine, a cloud infrastructure, a private compute infrastructure, an isolated environment such as an ICS environment or a secure facility, an embedded device, and so on. However, to take full advantage of the substantially concurrent and distributed nature of the data analytics platform 100, various aspects and embodiments contemplated herein may implement the data analytics platform 100 in a cluster topology, as described in further detail herein.

Figure 2:
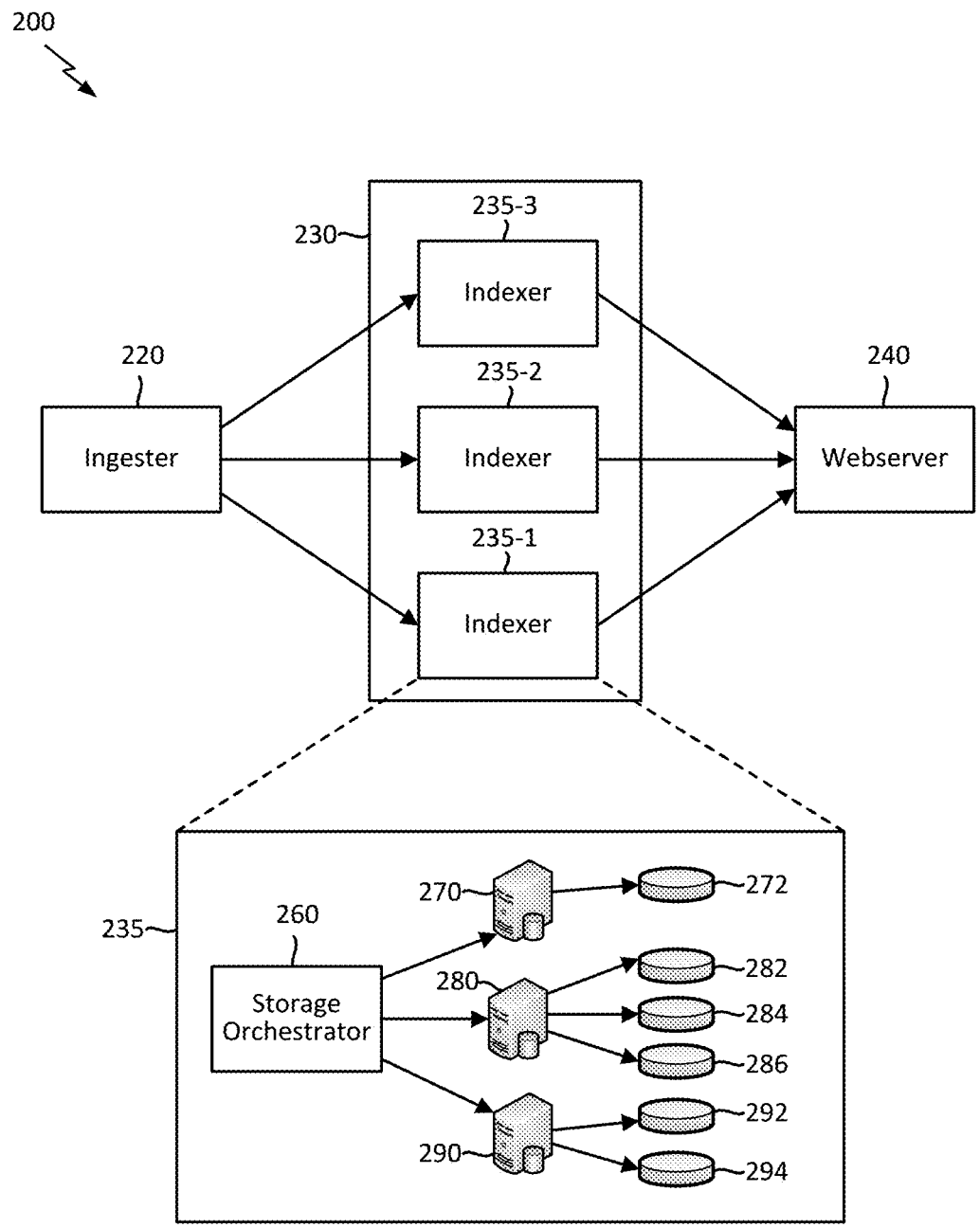
FIG. 2 illustrates an exemplary cluster topology that may be used in the data analytics platform shown in FIG. 1, according to various aspects.

More particularly, FIG. 2 illustrates an exemplary cluster topology 200 that may be used in the data analytics platform 100 shown in FIG. 1. As described earlier, the data analytics platform 110 is a highly concurrent distributed storage and search system designed to move fast and reduce the cognitive overhead required from a human user to effectively extract information from data streams. Effectively storing, searching, and managing substantial volumes of data that may conceivably approach hundreds of terabytes or more per day requires multiple machines utilizing a large array of storage devices. In that context, the cluster topology 200 shown in FIG. 2 illustrates a base architecture designed around indexers 235, ingesters 220, and webservers 240. None of the relationships are required to be one-to-one and every component is designed to load balance, be fault tolerant, and maximize usage of available hardware. For illustrative purposes, the assumption in FIG. 2 is that the cluster topology 200 is implemented in a very simple organization monitoring data from a single point (e.g., a small Internet Service Provider (ISP) with a network security monitoring service (e.g., Bro) running on an edge router that is capturing flows and sending them to the ingester 220.

Referring to FIG. 2, the cluster topology 200 shown therein uses a single ingester 220 to distribute data entries across three indexers 235-1, 235-2, 235-3. The ingester 220 may be configured to watch one or more data sources on the machine, derive timestamps, and send corresponding data entries to an indexer cluster 230 encompassing the indexers 235-1, 235-2, 235-3. In various embodiments, the ingester 220 may be configured to load balance across the three indexers 235-1, 235-2, 235-3 and reconnect should any of the indexers 235-1, 235-2, 235-3 become unavailable. For example, if indexer 235-2 went down (e.g., due to a hardware failure, a system upgrade, or for any other reason), the other two indexers 235-1, 235-3 would pick up the slack temporarily and the ingester 220 would eventually reconnect to the failed indexer 235-2 after coming back online. The indexer cluster 230 may generally be considered a consumption queue, in that the ingester 220 consumes data and produces data entries for the indexer cluster 230 to consume. As such, if one of the indexers 235-1, 235-2, 235-3 is faster than the others, that faster indexer 235 may consume and process more data entries at a faster rate, whereas a slower or overloaded indexer 235 will naturally consume and process fewer data entries. In various embodiments, the ingester 220 may be configured to obtain data entries from any suitable data source, without limitation. As such, provided that data can be encapsulated into an atomic item and associated with a timestamp, the ingester 220 may be configured to consume the data and provide the appropriate data entry to the indexer cluster 230 for storage and subsequent retrieval and processing.

Figure 3:
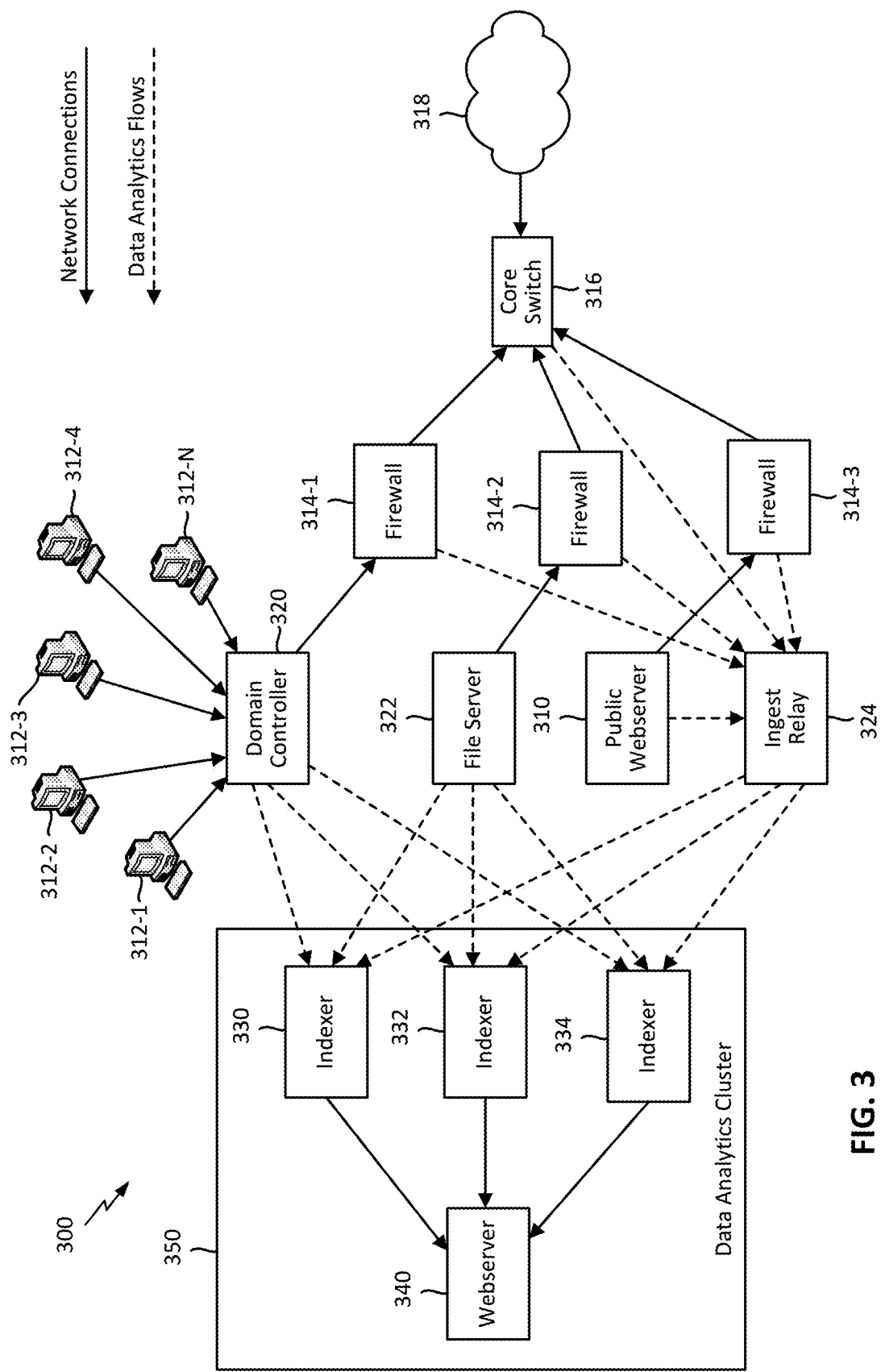
FIG. 3 illustrates an exemplary enterprise network in which the data analytics platform shown in FIG. 1 may be deployed, according to various aspects.

According to various aspects, the flexible ingest framework described herein may allow for other topologies that may be more complex and/or secure than the topology 200 shown in FIG. 2. For example, certain customers may wish to segment the data analysis platform from the rest of the infrastructure. The segmentation means that allowing all the workstations in a network to directly talk to the indexers is not desired. As such, as will be described in further detail below, the data analytics platform may support arbitrarily deep ingester federation, meaning that a network classification having multiple tiers may dual home one or more ingesters 220 to safely relay data from public networks to a private analysis network. As an example, FIG. 3 illustrates an exemplary enterprise network 300 in which the data analytics platform may be suitably implemented. In the particular example shown in FIG. 3, which is for illustrative purposes and not limiting in any sense, the enterprise network 300 includes a public facing webserver 310, one or more private file servers 322, one or more domain controllers 320, various firewalls 314-1, 314-2, 314-3, workstations 312-1 . . . N, and a core switch 316 or other suitable private switching gear that may provide connectivity to an external network 318 (e.g., the Internet). In the example enterprise network 300, resources have been segmented and certain business areas have been isolated.

For example, in FIG. 3, the enterprise network 300 may be segmented such that the public facing webserver 310 is on a different network segment than the workstations 312, the core switch 316 has private management local area networks (LANs), and each segment has a stateful firewall 314. Because this topology may not allow all data sources to directly talk to a data analytics cluster 350 encompassing the indexers 330, 332, 334 and the webserver 340, one or more ingester relays 320, 322, 324 that can be dual-homed and heavily fortified are deployed to relay data from untrusted networks such as the public webserver 310 to more trusted networks like the data analytics cluster 350. The workstations 312 are all pushing logs into the domain controller 320, which acts as an ingester relay pushing the logs into the data analytics cluster 350. In a similar respect, the data analytics cluster 350 may receive from the ingest relay 324 port activity logs, sflow records, and/or other suitable data relayed from the core switch 316, alerts relayed from the firewalls 314, etc. as well as file access logs from the file server 322.

Accordingly, the configuration shown in FIG. 3 may illustrate how an enterprise can push logs of various shapes and sizes into the data analytics cluster 250 and thereby achieve greater visibility into the total enterprise. Pulling disparate log sources may allow personnel to access and search large amounts of data from a single place (i.e., the data analytics cluster 350), reducing the time required to diagnose and fix problems. For example, information technology operations may be given the ability to debug problems at the public webserver 310 by correlating sflow logs from the core switch 316 to logs generated at the firewall(s) 314 and access records at the public webserver 310 in order to identify why a user cannot get to a particular page. In another example, security operations groups can track thumbdrives moving between domain boxes, or correlate port activity with logins to identify employees that may be attaching unauthorized equipment. As such, the data analytics cluster 350 may generally have the ability to monitor and correlate any suitable data type that can be fed into the indexers 330, 332, 334, including (without limitation) binaries such as portable executables, multimedia such as raw audio, video, and images, and so on. This may enable search queries to answer conceivably any suitable data-dependent question, such as using facial recognition to correlate badge reader swipes with the number of faces at a door.

According to various aspects, referring back to FIG. 2, an example configuration for an indexer node 235 will now be described. As described throughout this disclosure, the data analytics platform may be configured to operate in a substantially linear and concurrent manner throughout the entire stack, including a storage topology used in the indexer cluster 230 and by each indexer 235 in the indexer cluster 230. In general, the indexer node 235 is not implemented as a single storage system with a single storage array, but is instead configured to act as a storage orchestrator 260 coupled to a storage system that includes various wells across N machines (e.g., up to $2^{16}$, or approximately 65,000 wells), each of which can contain up to M storage arrays. In general, the wells do not have to be uniform, as storage resources can be allocated according to throughput requirements that are estimated for various data sources. Each storage array may operate concurrently, feeding the search pipeline and consuming from the ingester(s) 220 asynchronously. Accordingly, the asynchronous and distributed nature of the storage cluster may enable throughput to be ramped up by striping wells across multiple storage arrays. For example, in the configuration shown in FIG. 3, the indexer cluster 230 may be receiving data entries from syslog, sflow, and raw pcap ingesters 220, in which case the indexer node 235 may be allocated three wells. For example, a default well 270 capturing syslog and/or other general logging entries could point to a single large spinning disk array 272 where throughput is not critical and data is retained long term. However, an sflow well 290 may have slightly higher throughput requirements but lower retention requirements, whereby the sflow well 290 may point at one or more moderately sized storage arrays 292, 294, 286. A third well 280 dedicated to pcap data entries however must be extremely fast and spinning disks may not suffice. As such, the high throughput ingest and search requirements may be satisfied through use multiple storage arrays 282, 284, 286. The storage array concurrency and configurability may allow for substantially high throughput. High-end storage equipment may generally sustain higher read rates, whereby striping across a few high-end drive with a single well may allow the indexer node 235 to store and read at faster rates. Furthermore, because high-end storage might just shift the bottleneck from storage speed to memory bandwidth, performance may be improved through well-crafted queries created through trial-and-error or heuristic processes and/or memories with large well-managed caches.

According to various aspects, the storage orchestrator 260 may generally use the wells 270, 280, 290 to logically separate data entries of different types based on tags that are applied to the data entries at ingest points. For example, unique tags may be applied to syslog logs, Apache logs, network packets, video streams, audio streams, etc. to distinguish one data type from another. The wells 270, 280, 290 are the storage groupings that actually organize and store the ingested data entries. As such, each tag can be assigned to a certain one of the wells 270, 280, 290 so that data streams can be routed to faster or larger storage pools. For example, a raw pcap stream from a high bandwidth link may need to be assigned to a faster storage pool whereas log entries from syslog or a webserver may not require fast storage. A tag-to-well mapping is a one-to-one mapping, meaning that the same tag cannot be assigned to multiple wells. In various embodiments, a default well (e.g., well 270) may accept all tags, whereas any specifically configured wells (e.g., wells 280, 290) may accept data entries that are associated with certain tags. For example, the following snippet shows an indexer configuration with a well called "raw" that accepts data entries associated with pcap, video, testing, and apache tags and a default well that accepts all other data entries:

TABLE 4

Example Well Configuration

[Default-Well]
    Location =/opt/analytics /storage/default/
[storage-well "raw"]
    Location=/opt/analytics/storage/raw/
    tags=pcap
    tags=video
    tags=testing
    tags=apache In various embodiments, tag names may be restricted to alphanumeric values, which may make the tags more human-friendly. For example, the tag names may not contain dashes, underscores, special characters, etc., which may promote a design whereby the tags are simple names that are easy for a human to type and reflect the type of data in use (e.g., "syslog" or "apache"). Furthermore, in various embodiments, tags are not assigned to the default well, which instead gets all data entries that are either untagged or associated with tags that have not been explicitly assigned to another well. For example, if a well named "syslog" has been assigned the tags "syslog" and "apache", then all other tags will go to the default well. Although the ingester(s) 220 can still produce entries with tag names that are not explicitly defined, the data entries will be co-mingled with data entries associated with all other unassigned tags. Accordingly, the interaction between wells and tags is generally a management function that allows optimizing search, storage, and management of like data through describing a data subset via one or more human-friendly identifiers. According to various aspects, further detail relating to the storage topology associated with the indexer node 235 as shown in FIG. 2, including ageout policies, replication methods, and/or other suitable storage orchestration will be described in further detail below with reference to FIG. 6A-6D.

Figure 4:
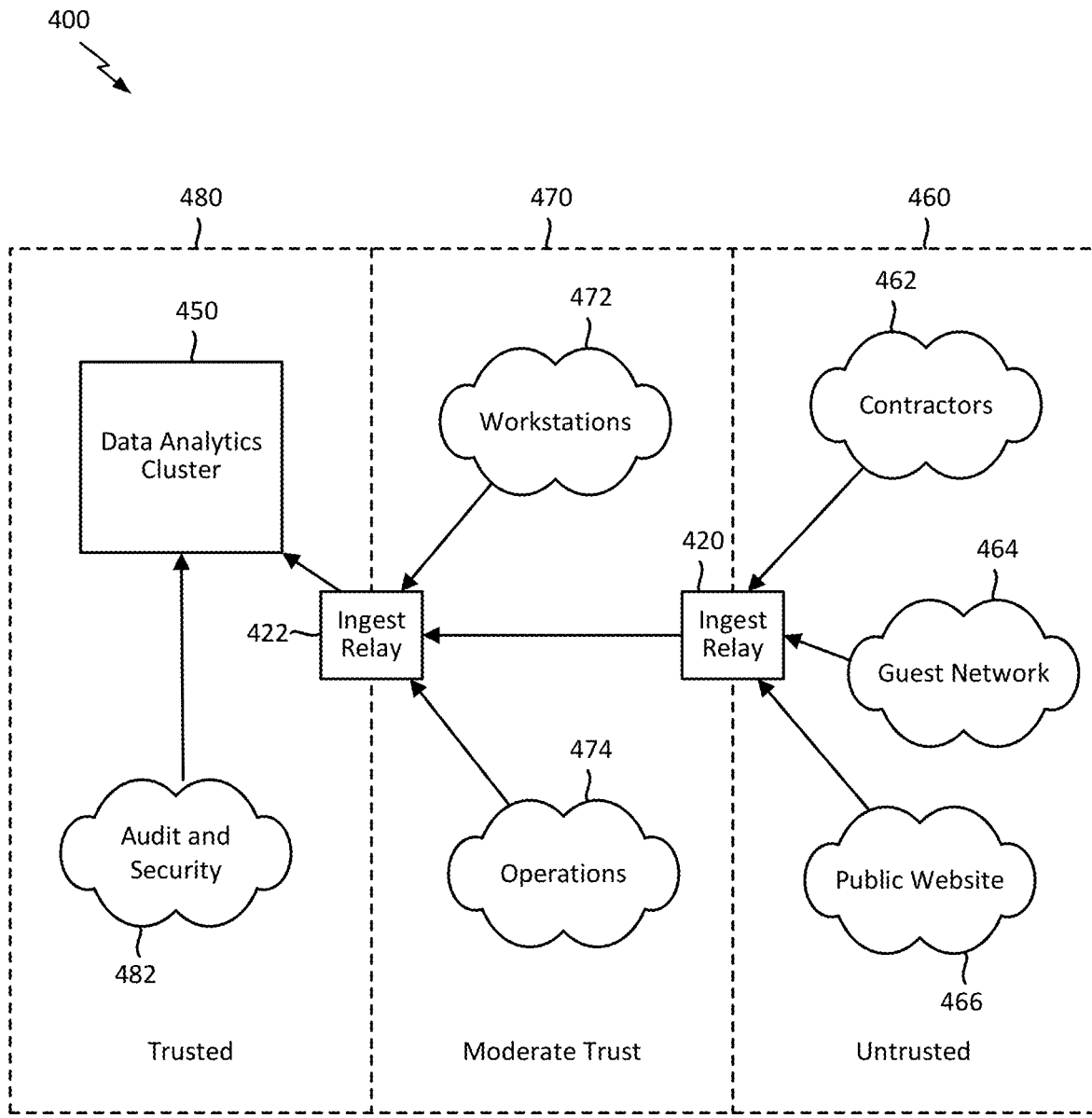
FIG. 4 illustrates an exemplary federated ingest topology that can be used to aggregate and relay data to a data analytics cluster, according to various aspects.

According to various aspects, as mentioned above, the data analytics platform described herein may support arbitrarily deep ingester federation, meaning that a network classification may have multiple tiers or segments with ingesters appropriately deployed to relay data between networks or network segments that may have different levels of trust (e.g., from a public network to a private analysis network). For example, FIG. 4 illustrates one exemplary federated ingest topology 400 that can be used to aggregate and relay data to a data analytics cluster 450, which may include one or more indexers and one or more webserver frontends as contemplated herein. More particularly, the core ingest mechanic as described herein only requires that a data entry be associated with a byte array and a timestamp, although applying an optional tag to the data entry may substantially improve storage and search performance.

While relatively simple installations might have only one or a few ingesters talking directly to the indexers in the data analytics cluster 450, more complicated ingest topologies may have multiple levels of federation as data is shuffled up from untrusted enclaves to high security enclaves. For example, the federated ingest topology 400 shown in FIG. 4 includes an untrusted segment 460 with a contractor network 462, a guest network 464, and a public website 466 feeding data to an ingest relay 420 deployed at a boundary between the untrusted segment 460 and a moderate trust segment 470. The moderate trust segment 470 in turn includes a workstation network 472 and an operations network 474 that, along with the ingest relay 420, feed data to another ingest relay 422 deployed at a boundary between the moderate trust segment 470 and a trusted segment 480 in which the data analytics cluster 450 is deployed. As such, the data analytics cluster 450 (including any indexers deployed therein) may receive data entries from the ingest relay 422 and may further receive data entries directly from a trusted audit and security network 482. In this manner, the federated ingest topology 400 uses ingest relays 420, 422 to route data entries to the data analytics cluster 450 without segregating data from the untrusted/moderately trusted segments 460, 470 or forcing multiple installations, thus providing the visibility that is key to data security, analytics, and hunt operations.

Figure 5:
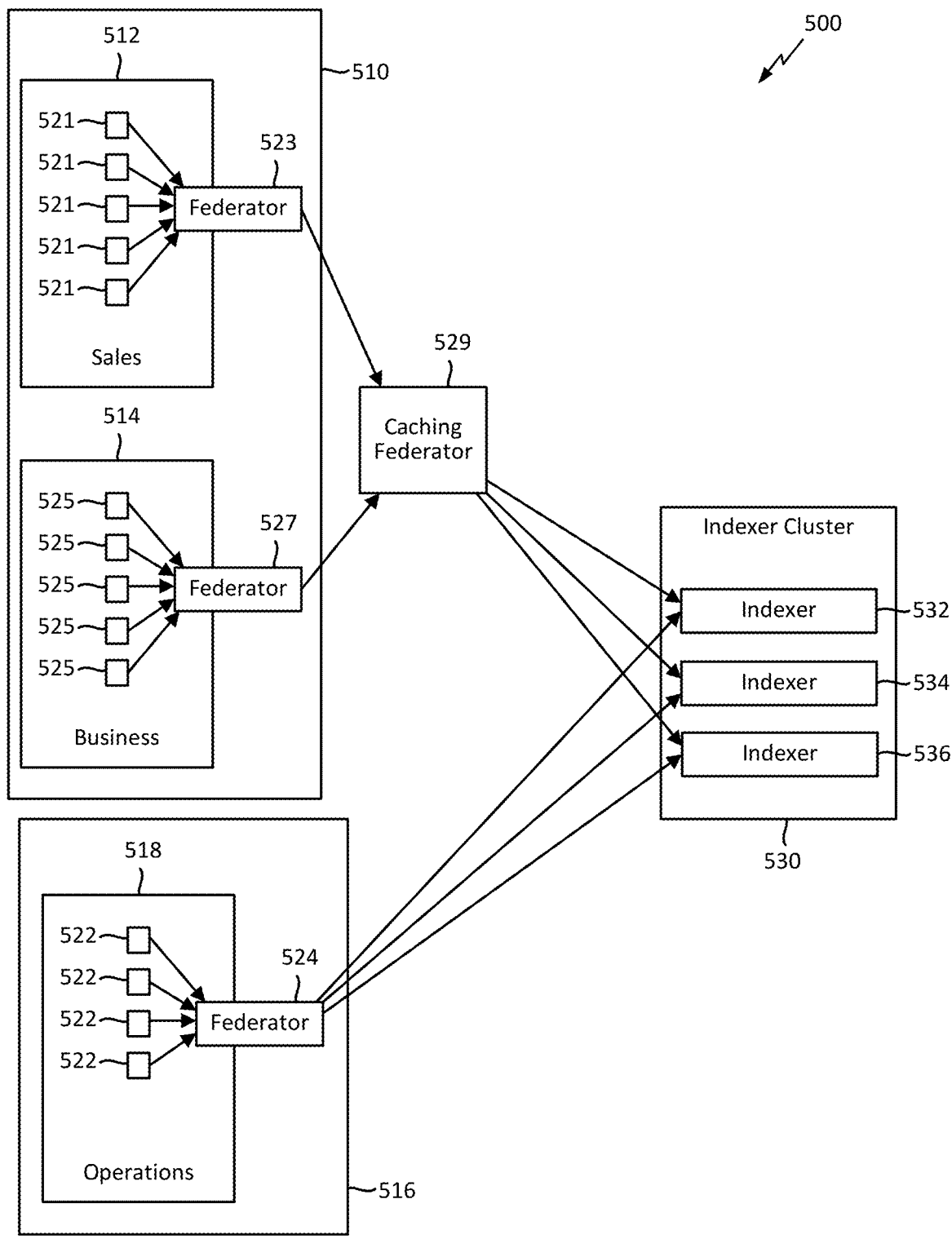
FIG. 5 illustrates another exemplary federated ingest topology that can be used to aggregate and relay data to a data analytics platform, according to various aspects.

According to various aspects, FIG. 5 illustrates another exemplary federated ingest topology 500 that can be used to aggregate and relay data to a data analytics platform (e.g., an indexer cluster 530) as described herein. More particularly, the federated ingest topology 500 shown in FIG. 5 may generally include various federators 523, 527, 524 that are configured to build a series of listeners that bind to a network and relay data entries to a next level in the federated ingest topology 500. For example, in FIG. 5, a first network segment 510 includes a sales subsegment 512 with various nodes 521 and a business subsegment 514 with various nodes 525. The federator 523 may bind to the various nodes 521 in the sales subsegment 512 and the federator 527 may similarly bind to the various nodes 525 in the business subsegment 514. The two federators 523, 527 may then relay any data entries ingested from the nodes 521, 525 to a caching federator 529, which in turn relays the data entries to various indexers 532, 534, 536. As further shown in FIG. 5, a second network segment 516 includes an operations subsegment 518 with various nodes 522, whereby the federator 524 may bind to the various nodes 522 in the operations subsegment 518 and relays any data entries ingested from the nodes 522 to the various indexers 532, 534, 536 deployed in the indexer cluster 530. Accordingly, the federators 523, 527, 524 can act as a trust boundaries, securely relaying entries across network segments without exposing ingest secrets or allowing untrusted nodes to send data for disallowed tags. The federator upstream connections may be configured like any other ingester described herein, allowing for multiplexing, local caching, encryption, etc.

As such, the federated ingest topologies 400, 500 described herein may be used to ingest data across geographically diverse regions when there may not be robust connectivity, provide an authentication barrier between network segments, control the tags that a data source group can provide, and/or reduce the number of connections to a given indexer (e.g., in FIG. 5, each indexer 532, 534, 536 has two connections, which would swell to fourteen without the use of the federators 523, 527, 524 and the caching federator 529, which may effectively act as a fault tolerant buffer between the indexers 532, 534, 536 and the untrusted network segments 512, 514.

Figure 6A:
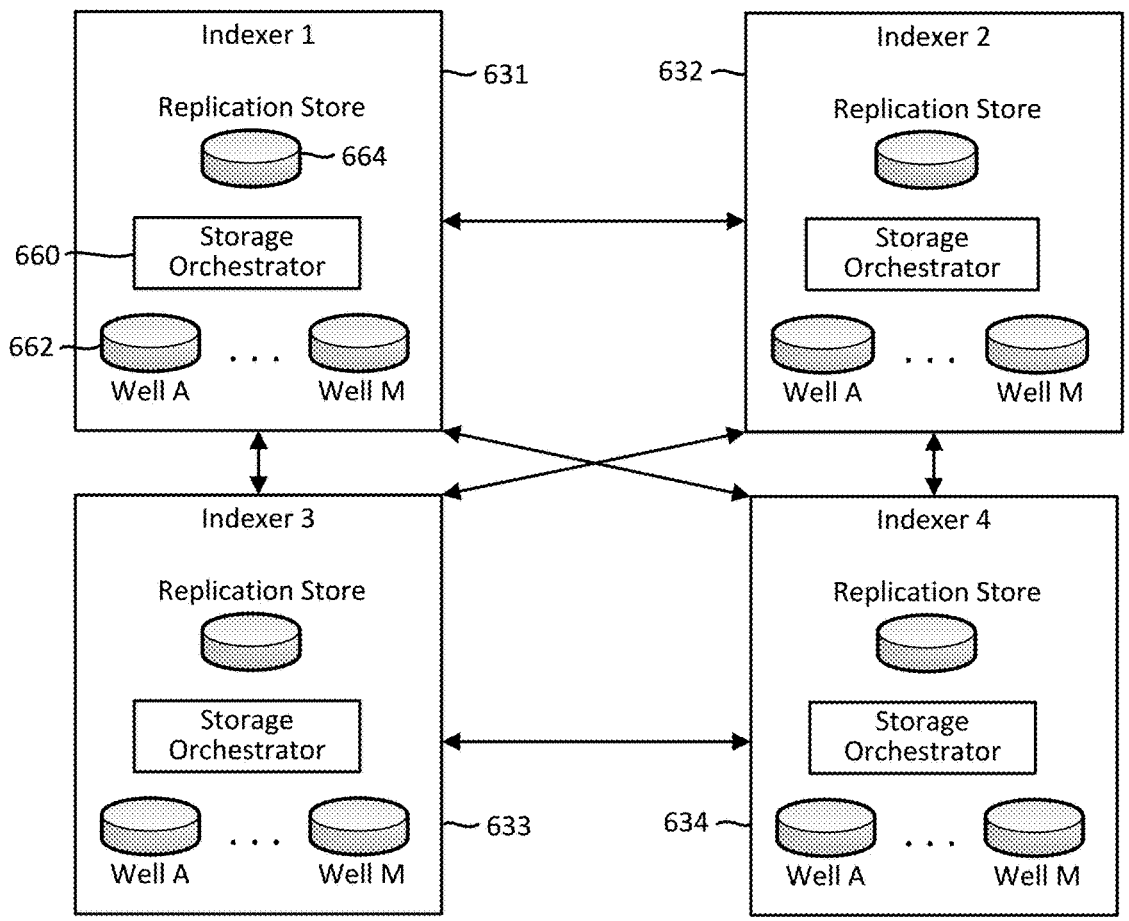
FIG. 6A-6D illustrate exemplary topologies that can provide fault-tolerant, high-availability, policy-based data storage, according to various aspects.

According to various aspects, referring now to FIG. 6A-6D, various exemplary topologies that can provide fault-tolerant, high-availability, policy-based storage for use in a data analytics platform will now be described. More particularly, FIG. 6A illustrates a topology in which each indexer 631, 632, 633, 634 includes a storage orchestrator 666 configured to distribute data entries among multiple wells 662 based on tags that are applied to the data entries at ingest points. Furthermore, in FIG. 6A, each indexer 631, 632, 633, 634 includes a replication store 664 that may be used to provide replication services for a fault-tolerant high-availability deployment.

For example, referring first to FIG. 6A, a replication engine (not explicitly shown) may be configured to transparently manage data replication across distributed indexers 631, 632, 633, 634 with automatic failover, load balanced data distribution, and compression. The replication engine may also provide fine-tuned control over which wells 662 are included in replication and how the data is distributed across peers. As such, a cluster may be deployed with uniform data distribution or according to a replication scheme that can tolerate entire data center failures using region-aware peer selection. The online failover system may also allow continued access to data even when one or more of the indexers 631, 632, 633, 634 are offline.

In general, the replication topologies may be logically separated into "Clients" and "Peers", with each of the indexers 631-634 potentially acting as both a peer and a client. A client is generally responsible for reaching out to known replication peers and driving the replication transactions. When deploying a cluster in a replicating mode, the indexers 631-634 may be configured to initiate a TCP connection to any peers that may be acting as replication storage nodes, which refers to nodes that receive replicated data. Replication storage nodes may be allotted a specific amount of storage and are configured to not delete data until that storage has been exhausted. If a remote client node deletes a data shard as part of normal ageout, as described below, the data shard is marked as deleted and prioritized for deletion when the replication node hits the storage limit. The replication engine prioritizes deleted shards first, cold shards second, and oldest shards last. Furthermore, all replicated data may be compressed; if a cold storage location is provided the replication storage location may be configured to have at least the same storage capacity as the cold and hot storage combined.

According to various aspects, FIG. 6A illustrates a uniform replication deployment in which each indexer 631-634 can replicate against every other indexer 631-634. As such, in the uniform replication deployment, each indexer 631-634 may have every other indexer 631-634 configured as a replication peer (e.g., indexer 631 may have indexers 632, 633, 634 configured as peers, indexer 632 may have indexers 631, 633, 634 configured as peers, etc.).

Figure 6B:
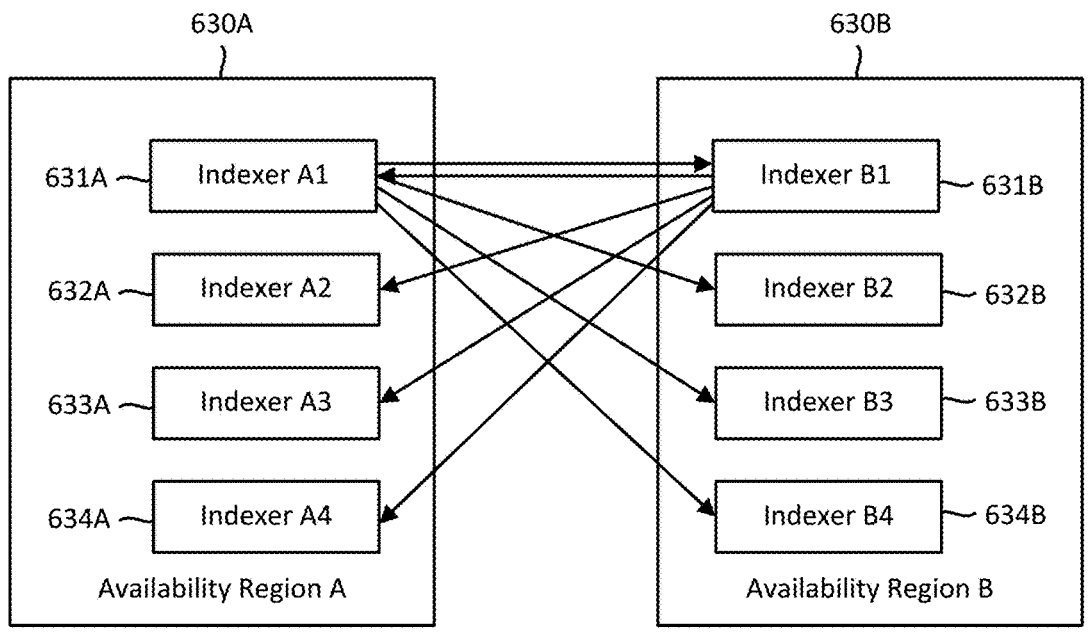

According to various aspects, FIG. 6B illustrates an example region-aware replication deployment in which each indexer 631A-634A, 631B-634B may have a similar configuration as shown in FIG. 6A (e.g., a storage orchestrator 666, various wells 662, and a replication store 664). In the region-aware deployment, the peers that a given indexer 631-634 is allowed to replicate data to may be fine-tuned, which may allow for availability regions where an entire region can be taken offline without losing data so long as no subsequent losses occur in the online availability zone. For example, in FIG. 6B, a first region 630A includes four indexers 631A-634A and a second region 630B includes another four indexers 631B-634B. The inter-region replication shown in FIG. 6B may thereby ensure that all data in the first region 630A is replicated at the second region 630B and vice versa such that one of the first region 630A or the second region 630B can go offline at a given time without any data loss or data unavailability.

Figure 6C:
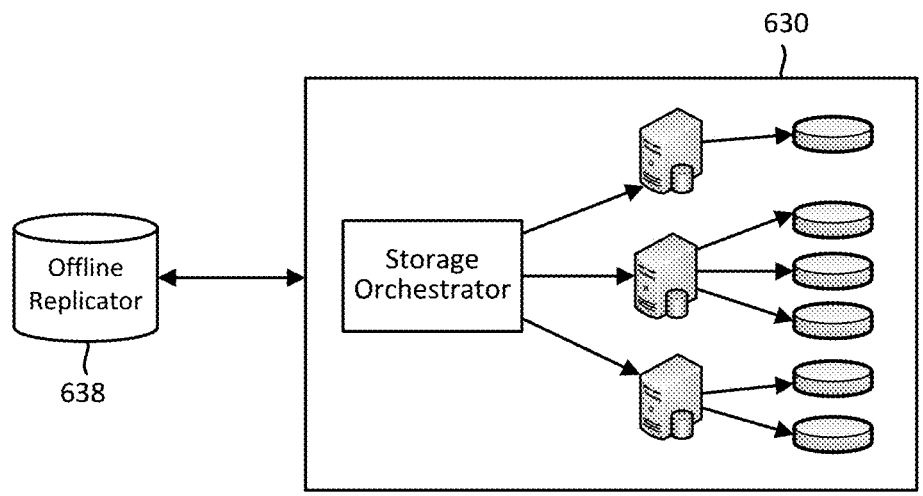

According to various aspects, FIG. 6C illustrates an exemplary offline replication topology using an offline replicator 638, which may be suitable for use in a deployment that includes a single indexer node 630. In this basic offline replication topology, replication may be entirely offline, meaning that if the indexer 630 goes offline, the data preserved in the offline replicator 638 cannot be searched until the indexer 630 comes back online and completes recovery from the offline replicator 638.

Figure 6D:
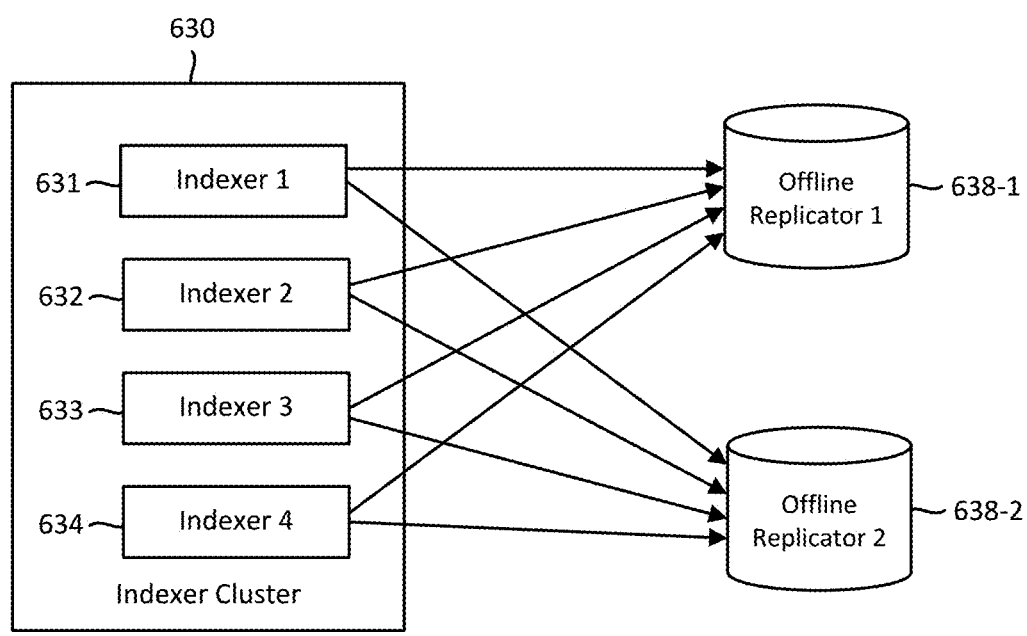

According to various aspects, FIG. 6D illustrates another exemplary offline replication topology using multiple offline replicators 638-1, 638-2, which may be well-suited to deployments in which an indexer cluster 630 includes multiple indexer nodes 631-634. In the example topology shown in FIG. 6D, the offline replicators 638-1, 638-2 act exclusively as replication peers and do not provide automatic failover or otherwise act as an indexer. Offline replication configurations can be useful in cloud environments where storage systems are already backed by a redundant store and loss is extremely unlikely. By using an offline replication configuration, as shown in FIG. 6D, data can be replicated to a low cost instance that is attached to very low cost storage pools that would not perform well as an indexer. In the unlikely event that one or more of the indexers 631-634 is entirely lost, one or more of the low-cost offline replication peers 638-1, 638-2 can be used to restore the higher cost indexer.

According to various aspects, the replication engine used in the replication topologies described above may be configured as a best-effort asynchronous replication and restoration system designed to minimize impact on ingest and search. The replication engine may attempt a best-effort data distribution while focusing on timely assignment and distribution. This means that shards are assigned in a distributed first-come, first-serve order with some guidance based on previous distribution. The system does not attempt a perfectly uniform data distribution and replication peers with higher throughput (either bandwidth, storage, or CPU) may take on a greater replication load than peers with less. In a cluster topology intended to support data replication, the replication storage may be over-provisioned by a suitable amount (e.g., from 10-15%) to allow for unexpected bursts or data distribution that is not perfectly uniform.

In general, the replication engine may ensure that at least two core pieces of data are backed up, wherein the core pieces include tags and the actual entries to which the tags are assigned. Each indexer 631-634 independently maintains the mapping of tag names to storage wells, which are used for effective searching. Because the mappings of tag names to storage wells are relatively small, every indexer 631-634 may replicate the entire map to every other replication peer, although data may only be replicated once due to the larger storage requirements associated therewith. In various embodiments, the replication engine may be configured to coordinate with data ageout, migration, and well isolation policies, which are described in further detail below. For example, when a given one of the indexers 631-634 ages out data to a cold storage pool or deletes the data entirely, the data regions are marked as either cold or deleted on remote storage peers. The remote storage peers may use deletion, cold storage, and shard age when determining which data to keep and/or restore on a node failure. If a given one of the indexers 631-634 has marked data as deleted, the data will not be restored should the indexer 631-634 fail and recover via replication. Data that has previously been marked as cold will be put directly back into the cold storage pool during restoration. Post-recovery, the indexers 631-634 may be restored to the same state that the indexers 631-634 were in pre-failure when recovering using replication.

In various embodiments, as noted above, the data analytics platform described herein may implement one or more data ageout, migration, and/or well isolation policies either alone or in conjunction with the replication aspects described above. More particularly, the data analytics platform may support a well ageout system, whereby data management policies can be applied to individual wells 662. The ageout policies may allow for controlling data retention, storage utilization, and compression for each well 662, wherein each well 662 generally operates independently and asynchronously from all others. Each well 662 may further support a hot storage location and a cold storage location with a set of parameters used to determine how data is moved from one storage system to the other. In various embodiments, a storage architecture used in the data analytics platform may include several relatively small pools of high-speed storage that can tolerate random accesses as well as a high volume and low-cost storage pool to be used for longer term storage. Neither searching nor ingestion is impeded during ageout. However, if data is actively coming into a storage shard that is marked for ageout or is actively being queried, the ageout system may defer aging out the shard to a later time.

In various embodiments, the ageout policies used to control data retention, storage utilization, and compression for each well 662 may be defined via one or more parameters, which may include but are not limited to a time parameter, a total storage parameter, and a storage available parameter. For example, in various embodiments, the time parameter may be used to specify data retention policies to ensure compliance with or otherwise adhere to certain policies, contractual agreements, legal requirements, and/or other suitable requirements. The total storage parameter may be used to specify a storage bound for a well 622 and to instruct the data analytics platform to only ageout or discard data when the amount of stored data exceeds the specified storage bound. The storage availability parameter may be used to specify storage availability constraints based on the amount of storage left on a device, which may be useful to free storage on a device but discard data if the device ever drops below some availability threshold. In various embodiments, each constraint can be added to a single well 622, allowing for an intersection of rules. In general, the ageout policies may be configured to optimize data storage as data entries are transferred from hot pools to cold pools, localizing data entries that fall within the same or a similar time range and and/or data entries that have the same tag or tags that are otherwise related (e.g., different tags that are assigned to the same well 622), which may substantially reduce head movement on traditional spinning disks. Combined with compression, the optimization phase can substantially improve storage utilization and search performance on data entries stored in the cold pools. The ageout system can be further configured to delete old data, as appropriate.

According to various aspects, as noted above, the time-based ageout parameter allows for managing data based on time retention requirements (if any), wherein the time-based parameter may optionally be configured separately for hot and cold storage pools. For example, an organization may have requirements that all logs be kept for a certain duration (e.g., ninety days). As such, in one example, a first time-based ageout parameter may indicate that data entries are to be moved from a hot storage pool to a cold storage pool after a first time period (e.g., a number of days, weeks, months, etc.), and a second time-based ageout parameter may indicate that data entries are to be deleted from the cold storage pool after a second time period. In another example, a well 622 may be configured to only use a hot storage pool and a single time-based ageout parameter may be defined to indicate that data entries are to be deleted from the hot storage pool after a given time period.

According to various aspects, the total storage parameter may be used to allocate a specific amount of storage in a volume regardless of time spans. In this manner, the storage constraints may allow for configuring an indexer 631-634 that makes aggressive and full use of high speed storage pools that may have a limited size (e.g., Non-Volatile Memory Express (NVME) flash). The indexer 631-634 may keep data entries in the storage pool as long as the well 622 has not consumed more than the total storage parameter allows. The storage constraints may also prevent disruptions to data storage due to unexpected bursts of ingest. For example, if a given indexer (e.g., indexer 631) has one terabyte of high-speed flash storage that typically handles seven days of hot storage but an unexpected data event causes 600 GB of ingest in a single day, the indexer 631 can age out the older data to a cold pool without disrupting the ability of the hot pool to continue to take on new data. Data shards may be prioritized according to time, with oldest shards aged out first for both hot pools and cold pools. In various embodiments, the total storage constraint(s) may not be defined as instantaneous hard limit, meaning that data can be ingested and aged out substantially concurrently (e.g., the ingested data may be permitted to cause the total storage constraint to be temporarily exceeded while the age out is in progress).

According to various aspects, as noted above, storage constraints can also be applied to a given well 622 based on storage availability. For example, one or more wells 622 may be low priority and configured to only consume storage when available. Using the storage available parameter may therefore be used to specify a well 622 that is permitted to consume as much space as needed, provided that a defined minimum amount of available storage is maintained. For example, specifying a given value for hot storage availability for a given well 622 may instruct the well 622 to either migrate data from a hot storage pool to a cold storage pool (if available) or delete the oldest data shards in the hot storage pool in the event that available storage in the hot storage pool drops below the specified value. The storage available parameter may further apply to the underlying volume that may be hosting the associated storage location, meaning that if the volume is also hosting other wells 622 or other arbitrary file storage, the well 622 can pull back on storage usage to maintain at least the minimum available storage.

Figure 7:
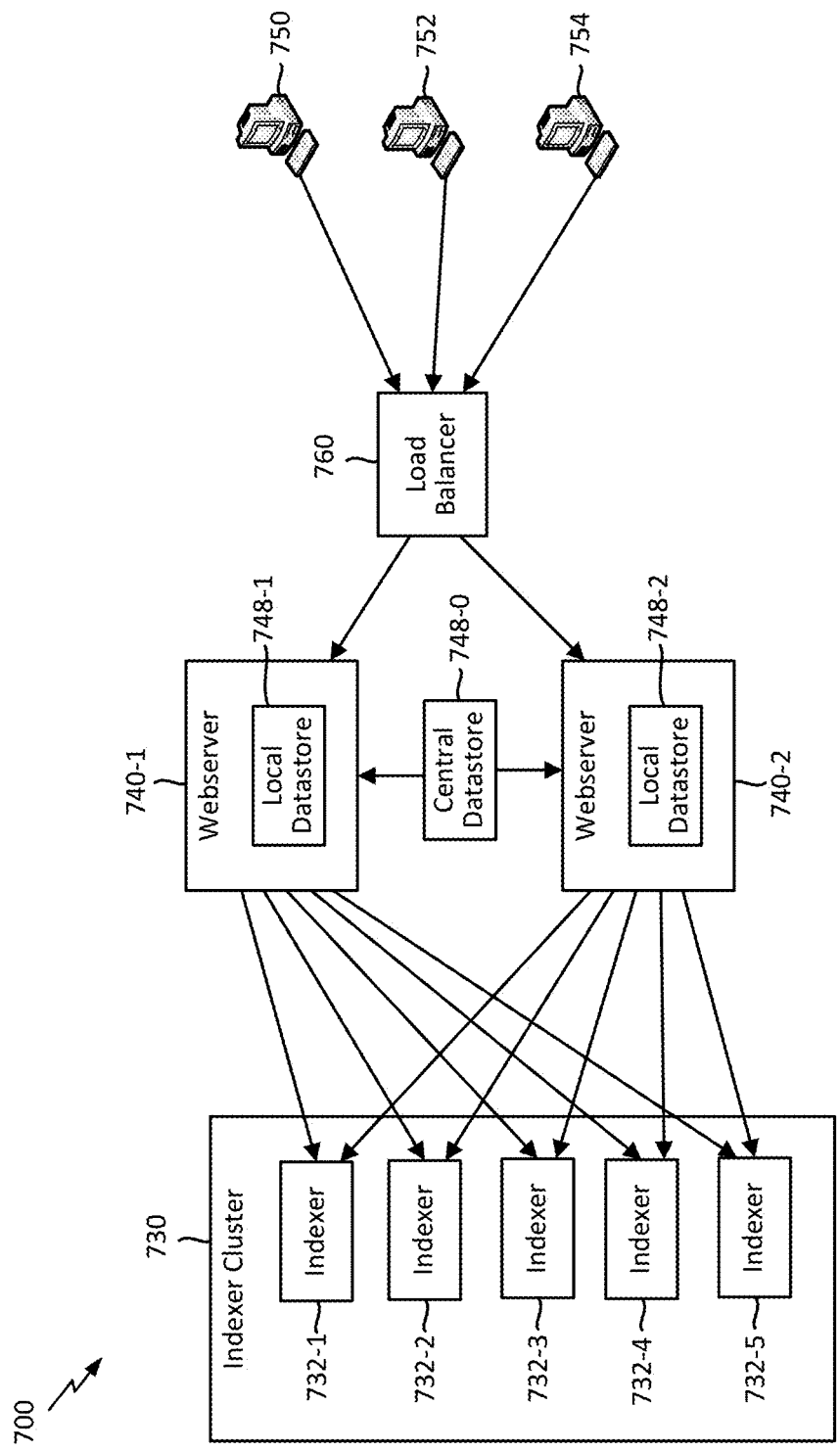
FIG. 7 illustrates an exemplary distributed frontend that can provide a load balanced and high availability data analytics platform, according to various aspects.

According to various aspects, referring now to FIG. 7, an exemplary distributed frontend 700 may be used to provide load balancing and high availability in the data analytics platform described herein. More particularly, in the distributed frontend 700, multiple webservers 740-1, 740-2 may be in communication with a central datastore 748-0, which may act as a central storage system shared among the multiple webservers 740-1, 740-2. As further shown in FIG. 7, the multiple webservers 740-1, 740-2 may be deployed behind a load balancer 760 for better search performance, as the webservers 740-1, 740-2 may synchronize resources, user accounts, dashboards, search histories, and/or other suitable information in a manner that is transparent to users at various client devices 750, 752, 754. In various embodiments, the central datastore 748-0 may be implemented to maintain state information across the multiple webservers 740-1, 740-2, wherein the central datastore 748-0 may manage authoritative copies of resources, user accounts, dashboards, search history, and/or any other suitable information that is used at the webservers 740-1, 740-2. When a webserver (e.g., webserver 740-1) makes a change to a given object in a local datastore (e.g., a dashboard maintained in local datastore 748-1), the webserver may push the modified object up to the central datastore 748-0. The webservers 740-1, 740-2 may periodically check the central datastore 748-0 to make sure that the local datastores 748-1, 748-2 are current and up-to-date. Accordingly, in response to determining that information related to one or more objects maintained in the local datastores 748-1, 748-2 has been changed or deleted within the central datastore 748-0, the change may be propagated to the appropriate local datastore(s) 748-1, 748-2.

In various embodiments, the multiple webservers 740-1, 740-2 may have a substantially similar (if not identical) configuration, or at least connect to the same set of indexers 732-1 . . . 5 in a given indexer cluster 730. The client devices 750, 752, 754 may access an IP address, URL, or other suitable address associated with the load balancer 760, which may then direct the client devices 750, 752, 754 to one of the multiple webservers 740-1, 740-2 in a round-robin fashion. The load balancer 760 may be further configured to make sessions between the client devices 750, 752, 754 and the webservers 740-1, 740-2 sticky (e.g., by setting a cookie or token in the client device 750, 752, 754). As such, traffic between a given client device 750, 752, 754 may go to the same webserver 740 after the initial access request to ensure that the webserver 740 has the relevant state information associated with the requesting client device 750, 752, 754. In various embodiments, the load balancer 760 and the multiple webservers 740-1, 740-2 may run in substantially independent environments (e.g., on separate machines, as separate containers or virtual machine instances on a single machine or in an orchestrated cloud environment, etc.). As such, additional webservers 740 may be added to or removed from the distributed frontend 700 as needed.

Figure 8:
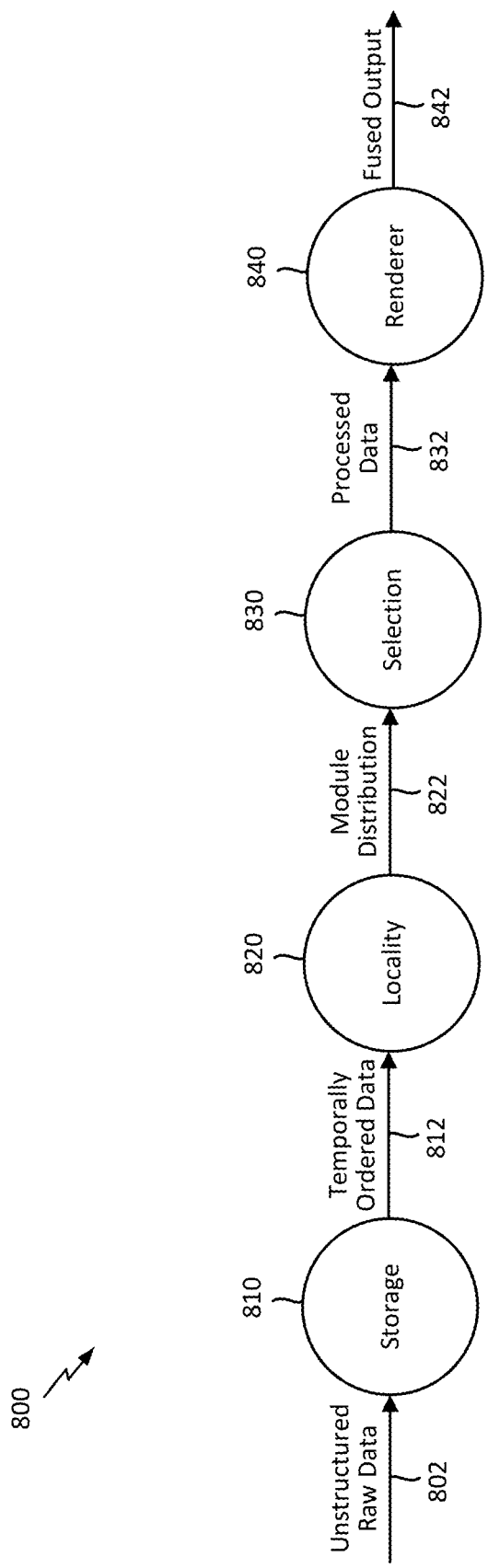
FIG. 8 illustrates an exemplary linear pipeline processing framework including multiple operator groups configured to use an abstracted query language to define a data fusion pipeline assembly mechanism, according to various aspects.

According to various aspects, referring now to FIG. 8, an exemplary linear pipeline processing framework 800 is illustrated in which multiple operator groups are configured to use an abstracted query language to define a data fusion pipeline assembly mechanism without requiring that data location, context, extraction, and/or normalization be explicitly defined. Instead, the data fusion pipeline may be assembled based on a search query expressed using the abstracted query language, in which one or more data sources may be specified (e.g., data entries that are associated with a specific tag or tags), then one or more search modules are specified to perform a given action on the specified data sources (e.g., filter, modify, sort, etc.), and finally a renderer module is specified to produce a fused and final output suitable for display to a user. In various embodiments, each search module and each renderer module may have a particular syntax and/or support a given number of arguments to define the action to be performed on the data entries flowing through the pipeline and/or to configure the fused and final output. The linear pipeline processing framework 800 as shown in FIG. 8 may therefor substantially reduce the cognitive overhead on a human operator to craft a data fusion pipeline compared to conventional architectures (e.g., MapReduce). The pipeline allows a human to think in terms of an assembly line, defining operations in discrete operations without the need to perform a join on fully normalized data. The linear pipeline processing framework 800 thereby removes the need for a user to be aware of data location or full normalization, while transparently leveraging concurrency to achieve high throughput. For example, in various embodiments, the linear pipeline processing framework 800 as shown in FIG. 8 may comprise a single concurrent pipeline that contains four operator groups, which include a storage operator group 810, a locality operator group 820, a selection operator group 830, and a renderer operator group 840.

In various embodiments, the storage operator group 810 may comprise a storage subsystem that allows for a data subset to be described via a series of human friendly identifiers or tags. For example, as described in further detail above, unstructured raw data 802 may be received at an ingester subsystem, which may be configured to bundle the unstructured raw data 802 into tagged data entries that each include at least a timestamp, a human-friendly identifier or tag, and a byte array. The storage operator group 810 may use the human-friendly identifiers or tags to select the appropriate storage locations for the tagged data entries across N machines, each of which may contain up to M storage arrays. For example, as described in further detail above, the storage locations may include a specific well configured to store data entries that have a given tag, wherein each well may be configured to store data entries associated with one or more specific tags. When needed, the storage operator group 810 may extract tagged data entries associated with a given search pipeline from the corresponding storage locations in a temporally ordered manner and stream the temporally ordered data entries into a unified pipeline, as depicted in FIG. 8 at 812. Furthermore, those skilled in the art will appreciate that the storage operator group 810 may perform various other tasks to turn the unstructured raw data 802 into the temporally ordered tagged data entries 812, as described in further detail above (e.g., implementing one or more ageout policies, implementing one or more replication methods, managing tag-to-well mappings, etc.).

According to various aspects, the locality operator group 820 may examine the totality of the abstracted query language as used in a given search query and dynamically determine the optimal locality of execution for each pipeline component, which may generally include one or more search modules and one renderer module. As a result, the human user need not think about where data entries are being processed as the data analytics platform instead distributes the appropriate pipeline modules for execution at locations that are co-resident with the stored data entries, as depicted at 822. The locality operator group 820 may also dynamically combine the data entries into a single processing stream. For example, the locality operator group 820 may distribute one or more pipeline components to be executed on the same machine(s) storing the tagged data entries to be operated on in a given search pipeline (e.g., the machine(s) associated with the well(s) that are mapped to the tag(s) indicated in the search query). In another example, one or more pipeline components may be distributed and executed on a webserver frontend that acts as a focusing point for all searches and provides an interactive interface into the data analytics platform. For example, the webserver frontend may participate in the search pipeline and often perform at least the rendering function in addition some filtering, metadata extraction, and data condensing functions.

According to various aspects, the selection operator group 830 may be configured to establish linkages from data groupings to the pipeline components (e.g., search and renderer modules as distributed at 822). In particular, the selection operator group 830 may logically organize the pipeline components in a linear and concurrent fashion with each pipeline component operating only on the data groupings that it is capable of, passing on all other data down the pipeline. The final renderer operator group 840 receives processed data 832 from the selection operator group 830 and down selects the processed data to only that which is needed in order to visualize or otherwise convey a fused and final output 842 to the user.

Accordingly, the storage operator group 810, the locality operator group 820, the selection operator group 830, and the renderer operator group 840 may work in conjunction to implement a methodology in which highly disparate data types such as text, sound, video, and others can be fused into a single normalized stream while allowing a human to think and operate in small discrete units. For example, the various operator groups 810-840 may provide the ability to organize data entries having highly disparate data types that may otherwise be entirely incompatible (e.g., text logs, network data, voice, video, etc.) into a single normalized stream. As such, processing and feature extraction may be performed on the organized data entries and the output may be normalized into a single stream where the data entries having the different data types can eventually be rendered using a single renderer. For instance, one concrete example of the unstructured data fusion methodology may be where video from a secure door entry system is streamed along with data from proximity sensors and/or keycard access logs. The unstructured data fusion methodology may provide the ability to operate on all three data streams to provide a single view into building access, which may be used to detect tailgating or people without valid keycards loitering around a secure door, among other things. In another example, Bro text logs may contain one or more IP addresses and netflow binary items may contain one or more IP addresses, wherein the Bro text logs and the netflow binary items may have completely different data types. Nonetheless, the linear pipeline processing framework 800 shown in FIG. 8 may provide the ability to process the two different data types in a single pipeline to create a fused output 842 with data from both types. For example, the fused output 842 might show a single stream of network activity with metrics from the netflow stream and security data from the Bro datastream. Accordingly, the storage operator group 810, the locality operator group 820, the selection operator group 830, and the renderer operator group 840 may collectively provide the ability to fuse unstructured data through joining entirely incompatible data types within a single normalized stream.

Figure 9:
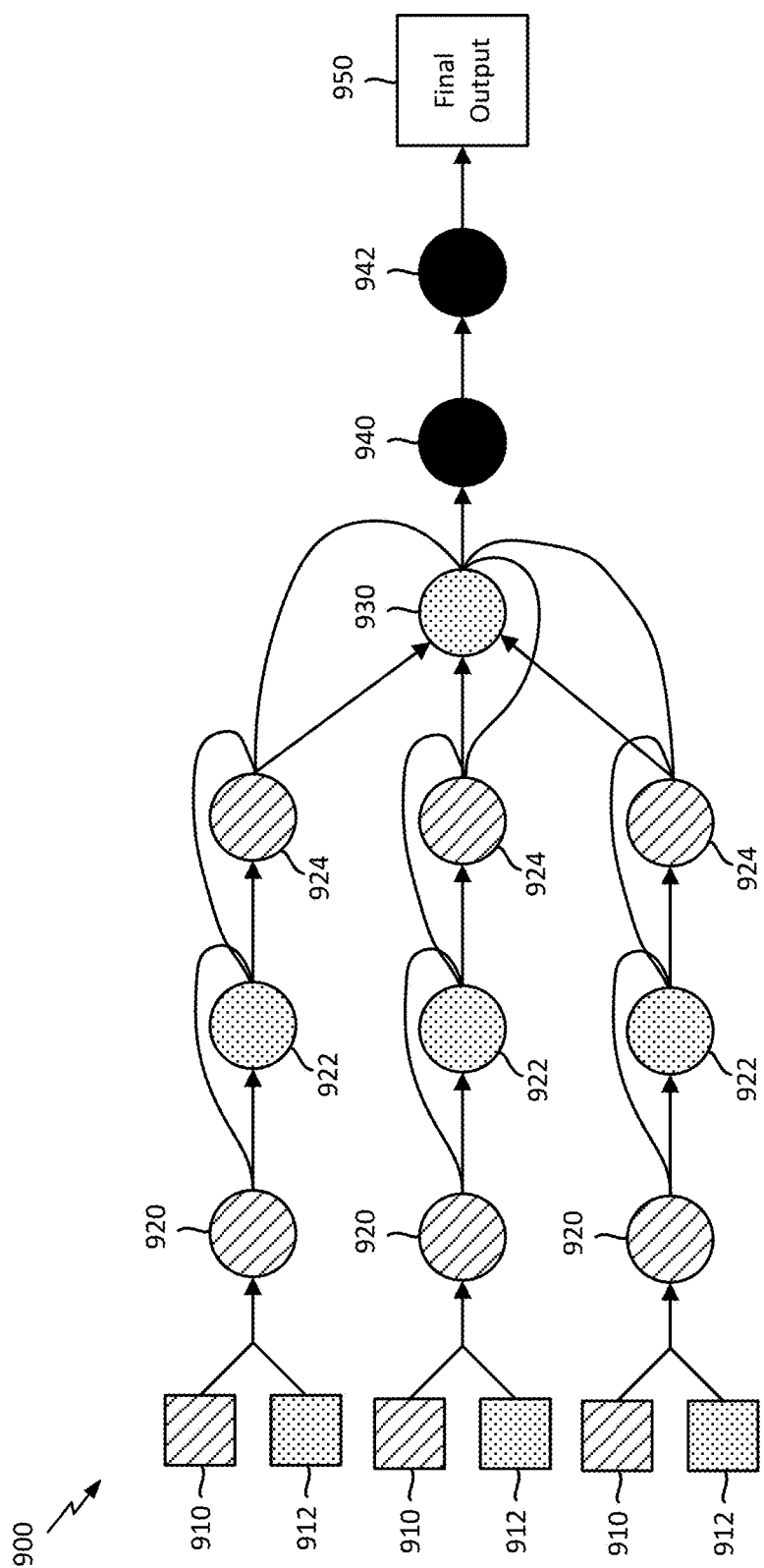
FIG. 9 illustrates an exemplary data fusion pipeline that may be assembled using the linear pipeline processing framework shown in FIG. 8, according to various aspects.

According to various aspects, FIG. 9 shows an example unstructured data fusion pipeline 900 embodying the above-described principles associated with the linear pipeline processing framework 800 described above. In the unstructured data fusion pipeline 900 contemplated in FIG. 9, there may be a pool of data entries based on unstructured raw data (e.g., text, sound, video, images, binaries, etc.), wherein the data entries may include a first temporally ordered data set 910 that includes a series of pictures and a second temporally ordered data set 912 that includes logs related to badge reader accesses against a given door. In a conventional architecture such as a MapReduce framework, the pictures in the first data set 910 and the badge reader access logs in the second data set 912 would need to be organized first to produce some structured data, which would then be reduced to enable a secondary query against the two data sets.

In contrast, the unstructured data fusion pipeline 900 may stream the first temporally ordered data set 910 and the second temporally ordered data set 912 into a substantially linear pipeline in an assembly line fashion, where the assembly line may include one or more modules 920, 922, 924, 930, 940, 942 that each know the particular type of data to be handled thereby. As such, a human user may think about the search pipeline in a substantially linear manner rather than having to find the appropriate data entries, assemble the data entries into appropriate transportable packages, transporting the packages, and then unpacking the data entries to enable analysis thereon. For example, referring to FIG. 9, suppose that the module(s) labelled 920, 924 are configured to operate on images and the module(s) labelled 922, 930 are configured to operate on log data. When the data entries in the first and second data sets 910, 912 are streamed into the pipeline, the module(s) labelled 920 may do their work on the pictures in the first data set 910 (e.g., identify a person in each picture, if any) and ignore everything else, which is passed down the pipeline. In a similar respect, the module(s) labelled 922 may do their work on the badge reader access logs in the second data set 912 and pass all other data down the pipeline, and so on. In this manner, image metadata analysis may be fused with log entry analysis such that the subsequent module(s) may have the ability to determine whether a first data entry containing a picture of a person who touched the door matches a second data entry containing an access log of a person who touched the door.

According to various aspects, with continued reference to FIG. 9, the unstructured data fusion pipeline 900 shown therein may therefore include one or more data sets 910 912, which may generally correspond to the storage operator group 810 shown in FIG. 8. As noted above, the data sets 910, 912 may be associated with one or more human-friendly tags or other suitable identifiers, which may be used to determine the appropriate storage locations associated with the data sets 910, 912. The storage operator group 810 may further extract the data sets 910, 912 from the appropriate storage locations and stream the data sets 910, 912 into the data fusion pipeline 900 in a temporally ordered manner (e.g., based on timestamps associated with the data entries contained in the data sets 910, 912). In various embodiments, the data fusion pipeline 900 may further include various processing modules 920, 922, 924 that are configured to operate on the data sets 910, 912 in a substantially linear manner, wherein different instances of the processing modules 920, 922, 924 may operate on the data sets 910, 912 in parallel. Furthermore, a processing module 930 may be implemented as a condensing module that causes the data fusion pipeline 900 to collapse, whereby any modules in the pipeline 900 following the condensing module 930 may receive the condensed data. In the particular example shown in FIG. 9, the condensing module 930 may be followed by a module 940 that may sort, normalize, or otherwise organize the condensed data, which in turn is followed by a renderer module 942 that produces a fused and final output 950 for display to a user.

In various embodiments, the locality operator group 820 as shown in FIG. 8 may determine the optimal locality to execute the various processing modules 920, 922, 924, 930, 940, 942. For example, assuming that the data sets 910, 912 are associated with certain storage locations, at least the processing modules 920, 922, 924 configured to operate on the data sets 910, 912 may be distributed for execution on a machine having at least one processor that is co-resident with the stored data sets 910, 912. In this manner, the human user need not think about where the data sets 910, 912 are being processed, as the locality operator group 820 distributes and executes the processing modules 920, 922, 924 at the appropriate location. In various embodiments, the locality operator group 820 may be implemented as part of the search orchestrator 160 illustrated in FIG. 1, placing one or more search modules 162 for execution locally with respect to the data entries that the search modules 162 are operating on. For example, referring to FIG. 1, any search module 162 that filters data or has a substantially atomic operation may be distributed and have a locality of an indexer 132. Furthermore, in various embodiments, because the condensing module 930 receives output from three parallel instances of the processing module 924, which may be distributed for execution on an indexer node where the data sets 910, 912 are located, one possible locality for executing the condensing module 930 may be on a webserver frontend configured to receive and perform further processing such as filtering, metadata extraction, and/or data rendering so that users can fluidly navigate search results as rendered in the final output 950. In a similar respect and for similar reasons, the webserver frontend may be a logical locality for executing the processing module 940 that receives the condensed data output from the condensing module 930 as well as the renderer module 942 that produces the final output 950.

In various embodiments, the various processing modules 920, 922, 924, 930, 940, 942 may implement the selection operator group 830 as shown in FIG. 8, thereby allowing the pipeline 900 to establish linkages between certain data groupings and the processing modules 920, 922, 924, 930, 940, 942. For example, the selection aspects may be performed via one or more tag descriptors that are handed to a search module (e.g. two json modules may be configured to perform different actions on different data based on the tag descriptor(s) provided to the respective modules). One example query that may fuse two different json data streams that both have an email address and a state but different structures can be as follows:

TABLE 5

Example Query Fusing Different Data Streams tag=dataA,dataB tag=dataA json user.email user.state as state |
    tag=dataB json email.address as email email.location as state |
    table email state Accordingly, the selection aspects described herein may cause each of the various processing modules 920, 922, 924, 930, 940, 942 to only operate on the data groupings that the processing modules 920, 922, 924, 930, 940, 942 have the capability to operate on, ignoring and passing all other data groupings down the pipeline 900. Furthermore, as noted above, the selection operator group 830 is used to organize the pipeline 900 into a linear and concurrent topology, wherein processing modules 920, 922, 924 operate in a linear manner and different instances of the processing modules 920, 922, 924 operate in a substantially concurrent manner. Furthermore, the output of the different instances of processing module 924 are linearly streamed to the condensing module 930, which operates in a linear and concurrent fashion with respect to the other processing modules 940, 942 down the pipeline 900. Finally, the renderer module 942 implements the renderer operator group 840 as shown in FIG. 8, receiving the processed output from the upstream modules in the pipeline 900 (specifically processing module 940) before down selecting the data to only that which is needed to visualize or otherwise convey the fused and final output 950 to the user.

According to various aspects, to further illustrate the fused and final output 950 that may be conveyed to the user, reference is made to FIG. 10A-10D, which illustrate exemplary fused and final outputs that may be rendered using the linear pipeline processing framework described herein. More particularly, the renderer module 942 as shown in FIG. 9 may generally be arranged or otherwise configured to receive data from the search modules in the pipeline 900 and to organize the data for display to the user. When possible, the renderer module 940 may further provide for a second order temporal index, which may allow the user to move around and zero in on certain time spans within the original search. In the following description, each search module in the pipeline 900 may be assumed to have universal enumerated values that include but are not limited to fields that indicate the source of the data entry, a tag attached to the data entry, and a timestamp associated with the data entry. In addition, one or more user-defined enumerated values may be utilized, wherein the user-defined enumerated values may be defined within a search query expressed according to an abstracted query language that allows for specifying the modules to include in the pipeline 900 and various parameters that control the manner in which the various modules operate on data flowing through the pipeline 900. The renderer module 942 may therefore utilize these enumerated values when producing the fused and final output 950 to be conveyed to the user.

Figure 10A:
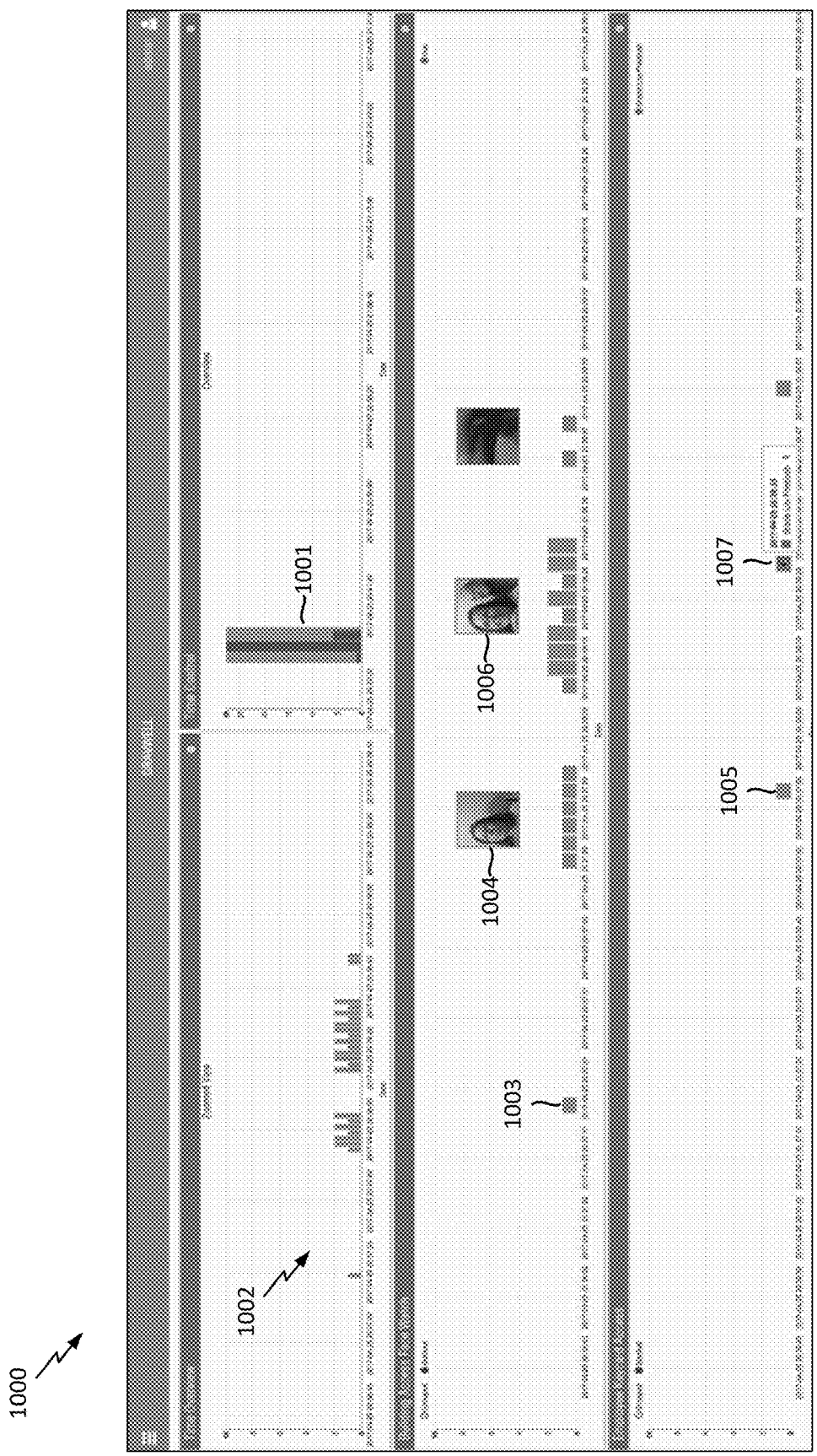
FIG. 10A-10D illustrate exemplary fused and final outputs that may be rendered using the data analytics platform described herein, according to various aspects.

For example, FIG. 10A illustrates a dashboard 1000 based on the above example whereby video or images from a secure door entry system may be streamed along with data captured at one or more proximity sensors and/or text logs captured at one or more keycard access systems. As shown in FIG. 10A, the various operator groups may work in conjunction, operating on all three data streams to provide a single view into building access, which may be used to detect tailgating or people without valid keycards loitering around a secure door, among other things. For example, FIG. 10A illustrates a dynamic pipeline analysis including a time control histogram depicting a cluster of events 1001 that may correspond to any suitable combination of faces detected on a camera, badge or keycard access swipes, proximity detection, etc. Furthermore, the dashboard 1000 may support a zoomed view 1002 that provides the ability to zoom in on the cluster of events 1001, whereby the zoomed view 1002 shows the cluster of events 1001 over a more focused time scale. Furthermore, in the middle row, the dashboard 1000 can use machine learning facial recognition (e.g., using one or more Haar Cascade classifiers) to plot a histogram of faces that were detected on camera at a given time correlated to badge or keycard swipe text logs, which are depicted in the lowermost row. Accordingly, as noted above, the dashboard 1000 can be used to identify piggy-backing into a secured building within the context of a data analytics platform that is agnostic to data type. For example, in the building access face watch histogram plot shown in the middle row, reference numeral 1003 may correspond to an event where a face was detected on camera. However, as there is no corresponding badge or keycard access swipe in the bottom row, this event may not be of interest (e.g., the event could have occurred because a person walked in front of a camera near the building entrance without making any attempt to enter the building). On the other hand, reference numeral 1004 depicts an event where a face detected on camera corresponds to a keycard access swipe, depicted at 1005. Reference numerals 1006, 1007 are illustrative of the above-mentioned "piggy-backing" scenario, where the image depicted at 1006 includes a second person behind the person who owns the keycard swiped at 1007. Thus, the recognition of the second person may trigger a potential security breach due to unauthorized building access.

Figure 10B:
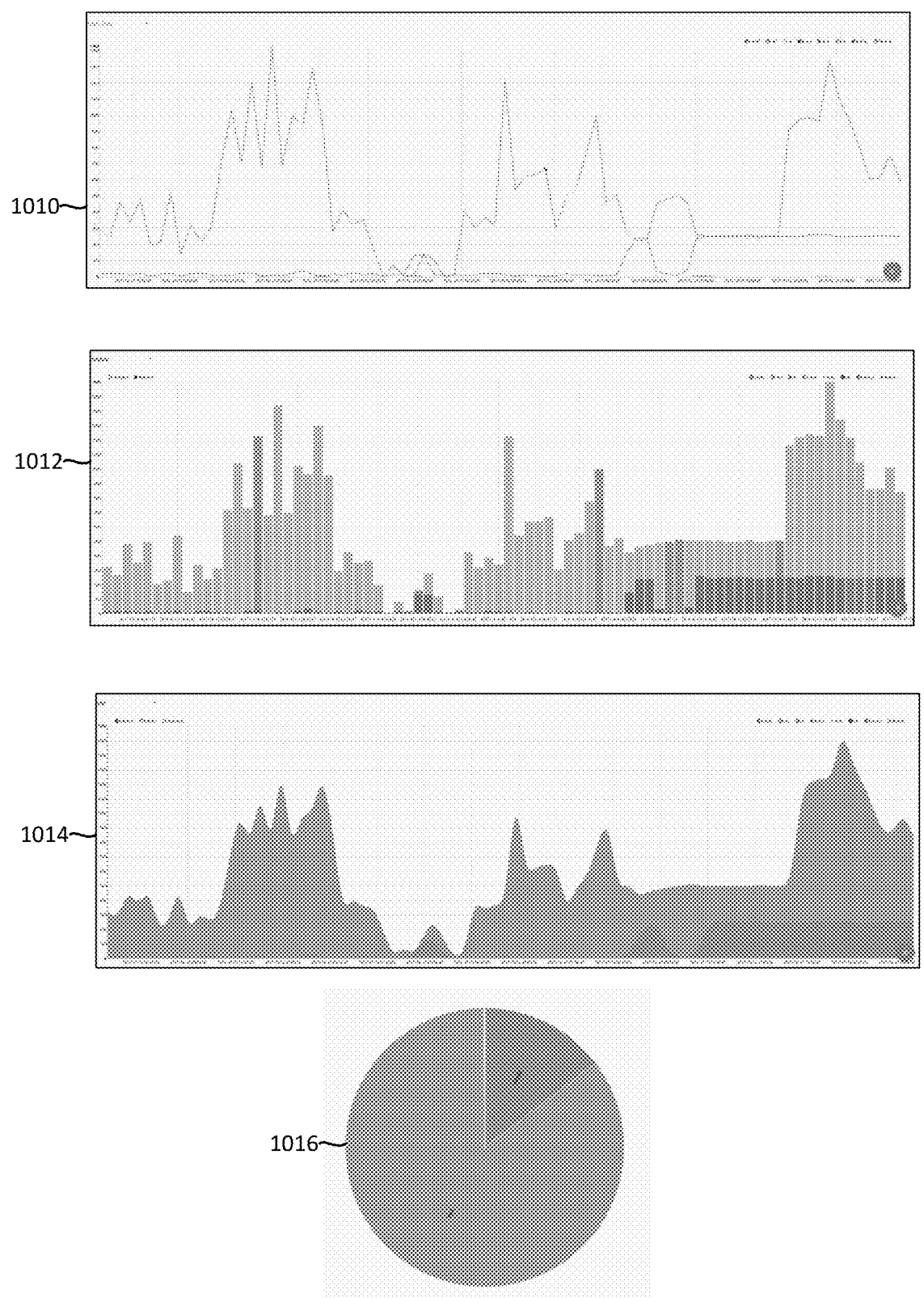

In another example, FIG. 10B illustrates several different views 1010, 1012, 1014, 1016 of a fused and final output that may be produced using a chart renderer module configured to display aggregate results (e.g., trends, quantities, counts, and other numerical data). In various embodiments, the chart renderer module may plot an enumerated value and optionally further plot the enumerated values according to a given parameter. For example, if there are counts associated with names, configuring the chart renderer module to plot the counts by name may result in a chart having a line for each name that shows the counts over time. The user interface for the chart renderer module may further allow for a rapid transition between line, bar, area, pie, and/or other suitable charts (e.g., donut charts, candlestick charts, etc.). For example, FIG. 10B illustrates a line chart 1010, a bar chart 1012, an area chart 1014, and a pie chart 1016 produced from the following sample query, which generates a chart showing which usernames most commonly fail Secure Shell (SSH) authentication (e.g., root, invalid, etc.).

TABLE 6

Example Search Pipeline tag=syslog grep sshd | grep "Failed password for" | regex "Failed\spassword\sfor\s(?P<user>\S+)" | count by user | chart count by user limit 64

Figure 10C:
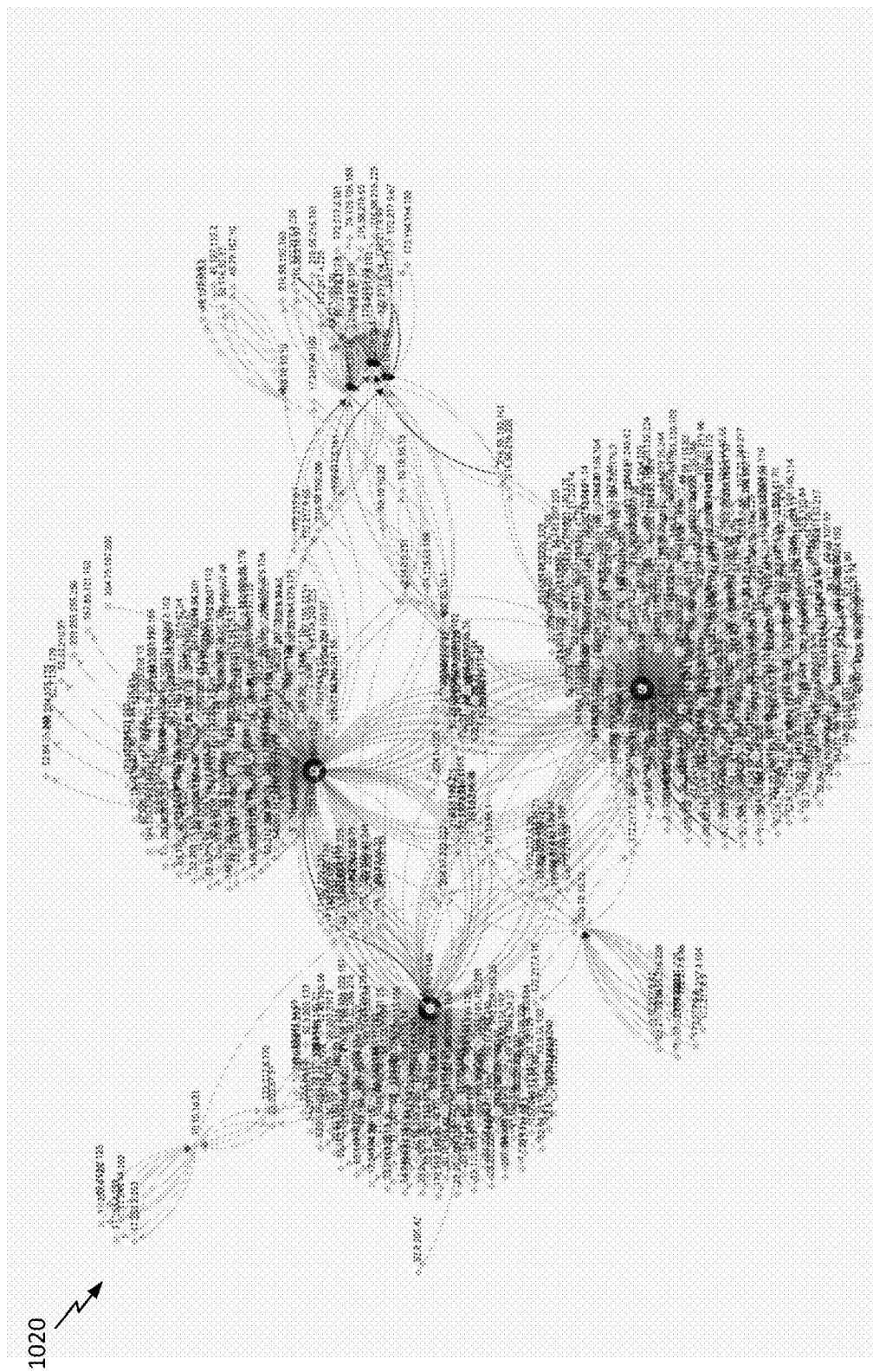

In another example, FIG. 10C illustrates an exemplary fused and final output 1020 taking the form of a force directed graph (fdg). The fdg renderer module may be configured to generate a directed graph using node pairs and optional grouping. The fdg module may further accept source and destination groups as well as a weight value for the resulting edge. In various embodiments, the fdg renderer module may further support options to indicate that edges are bidirectional, meaning that the pair [A, B] is equivalent to [B, A], to indicate that edges should be weighted as a sum of the provided enumerated value (e.g., to generate directed graphs where edges have weights represented by something other than a raw count), and/or to provide a group to apply to a source value and/or destination parameter used to color a graph (e.g., a subnet for an IP that enables a nodes in a graph to be grouped). For example, the force directed graph output 1020 shown in FIG. 10C may be produced from the following sample query, which may generate a weighted force directed graph of IPv4 traffic while grouping nodes into a class C network in order to identify relationships between addresses on a network.

TABLE 7

Figure 10D:

Example Search Pipeline tag=pcap packet ipv4.SrcIP ipv4.DstIP ipv4.Length | sum Length by SrcIP,DstIP | subnet -t SrcSub SrcIP /24 | subnet -t DstSub DstIP /24 | fdg -v sum -sg SrcSub -dg DstSub SrcIP DstIP In still another example, FIG. 10D illustrates an example heatmap output 1030, wherein a heatmap renderer module may translate search results onto a map. For example, the heatmap renderer module may place entries on the map based on locations in enumerated values (e.g., as defined using an enumerated value called "Location", which may be set using a geoip search module that can indicate the geographical location of an IP address, or the Location may be set explicitly). In various embodiments, the heatmap renderer module may take zero or one additional enumerated values as arguments, wherein a heat map may be generated using a number of entries for each location as the "heat" if zero enumerated values are given as arguments. For example, the heatmap output 1030 shown in FIG. 10D may be generated from the following search query, which uses netflow records with the "heat" representing the number of connections from a given location. Alternatively, if an additional enumerated value is given as an argument (e.g., the total number of bytes), the "heat" would be derived from the enumerated value (e.g., the number of bytes sent over the connection).

TABLE 8

Example Search Pipeline tag=netflow netflow IP | geoip IP.Lat IP.Long | heatmap -lat Lat -long Long Those skilled in the art will appreciate that the examples shown in FIG. 10A-10D are intended to be illustrative of the principles set forth herein and not intended to be limiting. In particular, other forms of fused and final output may be suitably generated depending on the appropriate context. For example, rather than a heatmap as shown in FIG. 10D, a pointmap could be produced instead, with entries translated into distinct markers placed on a map such that further details may be displayed when a given point is clicked. In another example, a table renderer could be used to create tables, a text renderer could be used to show human readable entries in a text format while converting non-printable characters to a default printable character (e.g., '.'), a stackgraph renderer could be used to display horizontal bar graphs with stacked data points, a raw renderer could be used to perform a similar function as the text renderer except without attempting to modify or change any non-printable characters, and so on.

Those skilled in the art will further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for unstructured data fusion, comprising:
receiving, at an indexer cluster comprising one or more indexer machines, a plurality of data entries that each comprise at least a timestamp, a tag, and a byte array;
selecting, at the one or more indexer machines, a location within a storage system for storing each of the plurality of data entries in a raw form based at least in part on the tag associated with each data entry;
assembling a data fusion pipeline configured to operate on multiple subsets of the plurality of data entries that have different data types and are associated with at least one tag, wherein the data fusion pipeline comprises one or more processing modules configured to process the different data types in the raw form, and wherein the one or more distributed processing modules are further configured to operate on the raw form of the byte array associated with each data entry in the multiple subsets of the plurality of data entries in a temporally ordered manner based on the timestamp associated with each data entry;
distributing the one or more processing modules for execution on one or more of the indexer machines that are co-resident with the location where the multiple subsets of the plurality of data entries are stored, wherein the one or more distributed processing modules are collectively configured to fuse the multiple subsets of the plurality of data entries that have the different data types into a single data stream, and wherein the multiple subsets of the plurality of data entries are temporally ordered in the single data stream based on the timestamp associated with each data entry; and
rendering, at a web server, an output to visualize temporally ordered results produced by the one or more processing modules, wherein the rendered output fuses temporally ordered information extracted from the multiple subsets of the plurality of data entries that have the different data types.

2. The method recited in claim 1, wherein the data fusion pipeline further comprises at least one processing module configured to operate on the single data stream fusing the multiple subsets of the plurality of data entries that have the different data types.

3. The method recited in claim 1, wherein the multiple subsets of the plurality of data entries originate from different data sources or have different data structures.

4. The method recited in claim 1, wherein the data fusion pipeline comprises a plurality of software components configured to operate on the multiple subsets of the plurality of data entries that have the different data types in a substantially linear manner.

5. The method recited in claim 4, wherein the plurality of software components forming the data fusion pipeline are specified using an abstracted query language.

6. The method recited in claim 4, wherein each of the plurality of software components forming the data fusion pipeline are configured to operate on the byte array associated with one or more data entries in the multiple subsets that match a pre-defined filtering algorithm and to pass all other data entries to a next software component in the data fusion pipeline unmolested.

7. The method recited in claim 6, wherein the plurality of software components forming the data fusion pipeline include at least a first set of one or more processing modules and a second set of one or more processing modules that are configured to operate on the multiple subsets of the plurality of data entries in parallel.

8. The method recited in claim 7, wherein the plurality of software components forming the data fusion pipeline further include a condensing module configured to receive processing results from the first set of processing modules and the second set of processing modules and to pass the received processing results in a condensed form to a subsequent software component in the data fusion pipeline.

9. The method recited in claim 1, further comprising:
extracting the multiple subsets of the plurality of data entries that are associated with the at least one tag from the storage system; and
streaming the multiple subsets of the plurality of data entries into the data fusion pipeline in the temporally ordered manner.

10. The method recited in claim 1, wherein the tag associated with each data entry is a human-readable identifier used to describe the respective data entry.

11. The method recited in claim 1, wherein the rendering comprises down selecting the results produced by the one or more processing modules to a dataset suitable for visualizing the rendered output via a user interface.

12. A data analytics system, comprising:
an indexer cluster comprising one or more indexer machines configured to receive a plurality of data entries that each comprise at least a timestamp, a tag, and a byte array and to select a location within a storage system for storing each of the plurality of data entries in a raw form based at least in part on the tag associated with each data entry;
a search orchestrator configured to assemble a data fusion pipeline configured to operate on multiple subsets of the plurality of data entries that have different data types and are associated with at least one tag, wherein the data fusion pipeline comprises one or more processing modules configured to process the different data types in the raw form, wherein the one or more distributed processing modules are further configured to operate on the raw form of the byte array associated with each data entry in the multiple subsets of the plurality of data entries in a temporally ordered manner based on the timestamp associated with each data entry, and wherein the search orchestrator is further configured to distribute the one or more processing modules for execution on one or more of the indexer machines that are co-resident with the location where the multiple subsets of the plurality of data entries are stored, wherein the one or more distributed processing modules are collectively configured to fuse the multiple subsets of the plurality of data entries that have the different data types into a single data stream, and wherein the multiple subsets of the plurality of data entries are temporally ordered in the single data stream based on the timestamp associated with each data entry; and
a web server configured to render an output to visualize temporally ordered results produced by the one or more processing modules, wherein the rendered output fuses temporally ordered information extracted from the multiple subsets of the plurality of data entries that have the different data types.

13. The data analytics system recited in claim 12, wherein the data fusion pipeline further comprises at least one processing module configured to operate on the single data stream fusing the multiple subsets of the plurality of data entries that have the different data types.

14. The data analytics system recited in claim 12, wherein the multiple subsets of the plurality of data entries originate from different data sources or have different data structures.

15. The data analytics system recited in claim 12, wherein the data fusion pipeline comprises a plurality of software components configured to operate on the multiple subsets of the plurality of data entries that have the different data types in a substantially linear manner.

16. The data analytics system recited in claim 15, wherein the plurality of software components forming the data fusion pipeline are specified using an abstracted query language.

17. The data analytics system recited in claim 15, wherein each of the plurality of software components forming the data fusion pipeline are configured to operate on the byte array associated with one or more data entries in the multiple subsets that match a pre-defined filtering algorithm and to pass all other data entries to a next software component in the data fusion pipeline unmolested.

18. The data analytics system recited in claim 17, wherein the plurality of software components forming the data fusion pipeline include at least a first set of one or more processing modules and a second set of one or more processing modules that are configured to operate on the multiple subsets of the plurality of data entries in parallel.

19. The data analytics system recited in claim 18, wherein the plurality of software components forming the data fusion pipeline further include a condensing module configured to receive processing results from the first set of processing modules and the second set of processing modules and to pass the received processing results in a condensed form to a subsequent software component in the data fusion pipeline.

20. The data analytics system recited in claim 12, wherein the one or more indexer machines are further configured to extract the multiple subsets of the plurality of data entries that are associated with the at least one tag from the storage system and to stream the multiple subsets of the plurality of data entries into the data fusion pipeline in the temporally ordered manner.

21. The data analytics system recited in claim 12, wherein the tag associated with each data entry is a human-readable identifier used to describe the respective data entry.

22. The data analytics system recited in claim 12, wherein the webserver is further configured to down select the results produced by the one or more processing modules to a dataset suitable for visualizing the rendered output via a user interface.

23. A non-transitory computer-readable storage medium having computer-executable instructions recorded thereon, wherein the computer-executable instructions are configured to cause one or more processors to:

receive, at an indexer cluster comprising one or more indexer machines, a plurality of data entries that each comprise at least a timestamp, a tag, and a byte array;

select, at the one or more indexer machines, a location within a storage system for storing each of the plurality of data entries in a raw form based at least in part on the tag associated with each data entry;

assemble a data fusion pipeline configured to operate on multiple subsets of the plurality of data entries that have different data types and are associated with at least one tag, wherein the data fusion pipeline comprises one or more processing modules configured to process the different data types in the raw form, and wherein the one or more distributed processing modules are further configured to operate on the raw form of the byte array associated with each data entry in the multiple subsets of the plurality of data entries in a temporally ordered manner based on the timestamp associated with each data entry;

distribute the one or more processing modules for execution on one or more of the indexer machines that are co-resident with the location where the multiple subsets of the plurality of data entries are stored, wherein the one or more distributed processing modules are collectively configured to fuse the multiple subsets of the plurality of data entries that have the different data types into a single data stream, and wherein the multiple subsets of the plurality of data entries are temporally ordered in the single data stream based on the timestamp associated with each data entry; and render, at a webserver, an output to visualize temporally ordered results produced by the one or more processing modules, wherein the rendered output fuses temporally ordered information extracted from the multiple subsets of the plurality of data entries that have the different data types.

\* \* \* \* \*